(12) United States Patent
Zheng et al.

(10) Patent No.: US 9,863,815 B2
(45) Date of Patent: Jan. 9, 2018

(54) METHOD AND APPARATUS FOR MULTIFREQUENCY OPTICAL COMB GENERATION

(71) Applicant: BEIHANG UNIVERSITY, Beijing (CN)

(72) Inventors: Zheng Zheng, Beijing (CN); Xin Zhao, Beijing (CN); Lei Liu, Beijing (CN); Jiansheng Liu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 13 days.

(21) Appl. No.: 14/968,289

(22) Filed: Dec. 14, 2015

(65) Prior Publication Data

US 2016/0169748 A1    Jun. 16, 2016

Related U.S. Application Data

(63) Continuation of application No. 14/475,434, filed on Sep. 2, 2014, now Pat. No. 9,273,994, which is a
(Continued)

(30) Foreign Application Priority Data

Mar. 2, 2012   (CN) .......................... 2012 1 0052680
Mar. 2, 2012   (CN) .......................... 2012 1 0052940
(Continued)

(51) Int. Cl.
*G01B 9/02* (2006.01)
*G01J 11/00* (2006.01)
(Continued)

(52) U.S. Cl.
CPC ................ *G01J 11/00* (2013.01); *G01J 1/10* (2013.01); *G01J 3/0224* (2013.01);
(Continued)

(58) Field of Classification Search
CPC ........ G01J 1/10; G01J 9/02; G01J 9/04; G01J 11/00; G01J 2009/006; G01J 2009/0207;
(Continued)

(56) References Cited

U.S. PATENT DOCUMENTS 7,327,445 B2   2/2008   Yin
7,436,596 B2   10/2008  Robertson
(Continued)

FOREIGN PATENT DOCUMENTS

CN   200710039620.6   9/2007
CN   200710047678.5   3/2008
(Continued)

OTHER PUBLICATIONS

A. Bartels, Femtosecond time-resolved optical pump-probe spectroscopy at kilohertz-scan-rates over nanosecond-time-delays . . . , Applied Physics Letters, vol. 88, pp. 041117, 2006.
(Continued)

*Primary Examiner* — Tarifur Chowdhury
*Assistant Examiner* — Jonathon Cook
(74) *Attorney, Agent, or Firm* — Sci-Law Strategies, PC

(57) ABSTRACT

A method and a system for measuring an optical asynchronous sample signal. The system for measuring an optical asynchronous sampling signal comprises a pulsed optical source capable of emitting two optical pulse sequences with different repetition frequencies, a signal optical path, a reference optical path, and a detection device. Since the optical asynchronous sampling signal can be measured by merely using one pulsed optical source, the complexity and cost of the system are reduced. A multi-frequency optical comb system using the pulsed optical source and a method for implementing the multi-frequency optical comb are further disclosed.

19 Claims, 16 Drawing Sheets

Related U.S. Application Data continuation-in-part of application No. 14/382,333, filed as application No. PCT/CN2013/072093 on Mar. 1, 2013, now Pat. No. 9,250,128.

(30) Foreign Application Priority Data

| | | |
|---|---|---|
| May 4, 2012 | (CN) | 2012 1 0137119 |
| May 4, 2012 | (CN) | 2012 1 0137481 |
| Feb. 28, 2013 | (CN) | 2012 1 0062796 |

(51) Int. Cl.

| | |
|---|---|
| *G01J 3/42* | (2006.01) |
| *G01J 3/10* | (2006.01) |
| *G01J 3/447* | (2006.01) |
| *G01J 3/02* | (2006.01) |
| *G01J 3/433* | (2006.01) |
| *G01J 1/10* | (2006.01) |
| *G02F 1/365* | (2006.01) |
| *H01S 3/00* | (2006.01) |
| *G02F 1/35* | (2006.01) |
| *G02F 1/37* | (2006.01) |
| *H01S 3/067* | (2006.01) |
| *H01S 3/11* | (2006.01) |
| *H01S 3/23* | (2006.01) |
| *H01S 3/08* | (2006.01) |

(52) U.S. Cl.
CPC ........... *G01J 3/0245* (2013.01); *G01J 3/10* (2013.01); *G01J 3/108* (2013.01); *G01J 3/42* (2013.01); *G01J 3/433* (2013.01); *G01J 3/447* (2013.01); *G02F 1/353* (2013.01); *G02F 1/365* (2013.01); *G02F 1/37* (2013.01); *H01S 3/0092* (2013.01); *H01S 3/1106* (2013.01); *G02F 2203/13* (2013.01); *H01S 3/06791* (2013.01); *H01S 3/0809* (2013.01); *H01S 3/1112* (2013.01); *H01S 3/2391* (2013.01)

(58) Field of Classification Search
CPC .......... G01J 3/0224; G01J 3/0245; G01J 3/10; G01J 3/108; G01J 3/42; G01J 3/427; G01J 3/433; G01J 3/447; G01B 9/02007; G01B 9/02014; G02F 1/353; G02F 1/39; G02F 1/365; G02F 1/37; G02F 2203/13; H01S 3/0092; H01S 3/1106; H01S 3/06791; H01S 3/0809; H01S 3/1112; H01S 3/2391

USPC ........................................................ 356/450
See application file for complete search history.

(56) References Cited

U.S. PATENT DOCUMENTS

| | | | |
|---|---|---|---|
| 7,639,362 B2 | 12/2009 | Ye | |
| 2005/0258368 A1* | 11/2005 | Ohtake | B82Y 20/00 250/338.1 |
| 2006/0061770 A1* | 3/2006 | Erskine | G01J 3/10 356/484 |
| 2006/0132793 A1* | 6/2006 | Ogawa | G01M 11/331 356/484 |
| 2008/0218860 A1 | 9/2008 | Robertson | |
| 2009/0010589 A1 | 1/2009 | Robertson | |
| 2009/0074016 A1* | 3/2009 | Marner | G01J 3/108 372/22 |
| 2009/0206263 A1* | 8/2009 | Rahman | G01J 3/02 250/341.1 |
| 2011/0069309 A1 | 3/2011 | Newbury | |
| 2011/0285980 A1 | 11/2011 | Newbury | |
| 2012/0062876 A1* | 3/2012 | Bennett | G01J 11/00 356/213 |
| 2012/0319005 A1 | 12/2012 | Robertson | |
| 2013/0114079 A1 | 5/2013 | Zheng | |
| 2013/0120750 A1 | 5/2013 | Zheng | |
| 2013/0146769 A1* | 6/2013 | Ouchi | G01J 3/42 250/338.1 |

FOREIGN PATENT DOCUMENTS

| | | |
|---|---|---|
| CN | 200810034530.2 | 8/2008 |
| CN | 200810039179.6 | 4/2009 |
| CN | 200810203454.3 | 4/2009 |
| JP | 2011242180 | 1/2011 |

OTHER PUBLICATIONS

A. Bartels, High-resolution THz spectrometer with kHz scan rates, Optics Express, vol. 14, pp. 430-437, 2006.

I. Coddington, Rapid and precise absolute distance measurements at long range, Nature Photonics, vol. 3, pp. 351-356, 2009.

T. A. Liu, Sub-micron absolute distance measurements in sub-millisecond times with dual free-running femtosecond Er fiber-lasers, Optics Express, vol. 19, pp. 18501-18509, 2011.

P. A. Elzinga, Pump/probe method for fast analysis of visible spectral signatures utilizing asynchronous optical sampling, Applied Optics, vol. 26, pp. 4303-4309, 1987.

* cited by examiner

METHOD AND APPARATUS FOR MULTIFREQUENCY OPTICAL COMB GENERATION

PRIORITY CLAIM

This application is a continuation of (1) U.S. national phase application Ser. No. 14/475,434 "A method and apparatus for optical asynchronous sampling signal measurement" by Zheng Zheng et al., filed Sep. 2, 2014 which was a continuation in part of (2) U.S. national phase application Ser. No. 14/382,333 "A method and apparatus for optical asynchronous sampling signal measurement" by Zheng Zheng et al., filed Sep. 1, 2014, which claims priority to (3) PCT Patent Application No. PCT/CN2013/072093 published as "A method and apparatus for optical asynchronous sampling signal measurement" by Zheng Zheng et al., filed Mar. 1, 2013, which claims priority to (4) Chinese application No. 201210052940.6 filed Mar. 2, 2012, (5) Chinese application No. 201210052680.2 filed Mar. 2, 2012, (6) Chinese application No. 2012100137481.1 filed May 4, 2012, (7) Chinese application No. 2012100137119.4 filed May 4, 2012, and (8) Chinese application No. 201210062796.9 filed Feb. 28, 2013 the specification and drawings of (1)-(8) are herein expressly incorporated by reference in their entireties.

FIELD OF THE INVENTION

The invention relates to the field of optical measurement, and particularly relates to a method and apparatus for optical asynchronous sampling signal measurement.

BACKGROUND OF THE INVENTION

Optical asynchronous sampling is a technique in which two precise frequency locked optical frequency combs with a small frequency spacing differences are used to achieve high-precision time domain "equivalent sampling" signal measurement. The high-precision time domain "equivalent sampling" signal measurement is similar to the principle used in the equivalent sampling oscilloscope.

SUMMARY OF THE INVENTION

The optical asynchronous sampling technique has been applied to pump-probe, terahertz time-domain spectroscopy, distance measurement and other fields. However, the light sources used previously by researchers are two individual lasers with a specified repetition frequency difference. The two lasers require a complex electronic feedback control system to keep the frequency difference stable and maintain phase locking, which is complex, high cost and hard to use. One light source could emit two laser pulses with different repetition rates by leveraging the modal dispersion, the polarization mode dispersion, the birefringence and the chromatic dispersion in the optical resonant cavity. Due to the stability of such kinds of dispersion, the repetition frequency difference of the two laser pulses could be quite stable. Dual-repetition-frequency (dual-frequency) light source realized by using this method has the advantages of structure simplicity, easy to integrate etc., so that the optical asynchronous sampling signal measurement system is simpler and more convenient to implement.

DETAILS OF THE INVENTION

In view of the problems existing in the prior art, the invention provides methods and apparatuses for optical asynchronous sampling signal measurement.

The application provides a method for optical asynchronous sampling signal measurement, whose characteristics comprise:

Step 1, a pulsed light source emits more than two optical pulse sequences with different repetition frequencies, one of which with the first repetition frequency of $f_1$ is the first optical pulse sequence, the other with the second repetition frequency of $f_2$ is the second optical pulse sequence, where $\Delta f$ is the repetition frequency difference between the first optical pulse sequence and the second optical pulse sequence, i.e. $\Delta f=|f_1-f_2|$;

Step 2, the first optical pulse sequence is transformed into a signal pulse sequence through the signal optical path, the second optical pulse sequence is transformed into a reference pulse sequence through the reference optical path;

Step 3, the signal pulse sequences and the reference pulse sequence interact in the detection device to obtain the asynchronous sampling signal determined by $f_1$ and $f_2$; and Step 4, the time axis of the asynchronous sampling signal is transformed based on the transform formula $\Delta T=\Delta\tau\Delta f/f_1$, where $\Delta\tau$ is the temporal position in asynchronous sampling signal, $\Delta T$ is the actual temporal position, to retrieve the time domain information. The time domain spectral information can be obtained by means of transforming between time domain and frequency domain.

The measurement method above can be applied in the following five examples, respectively, for the terahertz signal measurement, the pumped-probe signal measurement, the time-domain spectroscopy measurement, the optical distance measurement based on correlation signal measurement and the optical distance measurement based on non-correlation signal measurement:

1. In an example, in step 2, the first optical pulse sequence is input to a terahertz emission device, after going through the power control, the pulse waveform conversion, the polarization control and/or the frequency doubling transformation, the signal pulse sequence is formed when the terahertz pulse sequences generated by terahertz emission device is passed through the device under test. The second optical pulse sequence is transformed into the reference pulse sequence, after going through the power control, pulse waveform conversion, polarization control and/or frequency doubling transformation; in step 3, the signal pulse sequences and the reference pulse sequences are input to a terahertz receiving device together, after detected by a photodetector, the asynchronous sampling signal is obtained; in step 4, after data-processing of the asynchronous sampling signal, the terahertz time domain information and/or the time-domain spectroscopy information can be obtained.

Specifically, the aforementioned asynchronous sampling signal measurement method for the terahertz signal measurement includes:

The first step, the pulsed light source generates optical pulse sequences with more than two different repetition frequencies, which are split into the first optical pulse sequence with the repetition frequency of $f_1$ and the second optical pulse sequence with the repetition frequency of $f_2$ after the pulse beam splitting, the repetition frequency difference ($\Delta f$) between the first optical pulse sequence and the second optical pulse sequence is equal to the absolute value of $f_1$ minus $f_2$ ($|f_1-f_2|$).

The second step, the first optical pulse sequence or the part of it is passed through the power amplification, the power control, the pulse waveform conversion, the polarization control, the frequency doubling transformation, to form a pump optical pulse sequence, which is input into the terahertz emission device, through the photoconductive method, the optical rectification method or the surface effect method to generate a terahertz signal. The terahertz signal is formed into the signal pulse sequence after passing through the device under test; the second optical pulse sequence or the part of it is passed through the optical power amplification, the power control, the pulse waveform conversion, the polarization control, the frequency doubling transformation, to form an optical pulse sequence, namely the reference pulse sequence;

The third step, the signal pulse sequence and the reference pulse sequence are input into the terahertz receiver together, based on the photoconductive sampling or electro-optic sampling method, an asynchronous sampling signal related to the terahertz time domain waveform is obtained;

The fourth step, by means of the data processing of the asynchronous sampling signal, the time axis conversion relationship between the terahertz time-domain signal and the asynchronous sampling signal is $\Delta T = \Delta \tau \Delta f / f_1$, where $\Delta \tau$ is the temporal position of the asynchronous sampling signal, $\Delta T$ is the temporal position of the terahertz time-domain signal. Furthermore, through the transformation between the time domain and the frequency domain, the terahertz time-domain spectroscopy information can be obtained.

2. In an example, in step 2, the first optical pulse sequence is transformed into a signal pulse sequence after going through the power control, the pulse waveform conversion, the polarization control and/or the frequency doubling transformation. The second optical pulse sequence is transformed into a reference pulse sequence after going through the power control, the pulse waveform conversion, the polarization control and/or the frequency doubling transformation; in step 3, the signal pulse sequence and the reference pulse sequence are input to the device under test, and then the signal pulse sequence is detected by the photodetector to get an asynchronous sampling signal; in step 4, after the data processing of the asynchronous sampling signal, the pump-probe signal of the device under test can be obtained.

Specifically, the asynchronous sampling signal measurement method described above for the pump probe signal measurement includes:

The first step, the pulsed light source generates optical pulse sequences with more than two different repetition frequency, which are split into the first optical pulse sequence with the repetition frequency of $f_1$ and the second optical pulse sequence with the repetition frequency of $f_2$ after the pulse beam splitting, the repetition frequency difference between the first optical pulse sequence and the second optical pulse sequence is $\Delta f = |f_1 - f_2|$.

The second step, the first optical pulse sequence or the part of it is passed through the power amplification, the power control, the pulse waveform conversion, the polarization control, the beam splitter or the frequency doubling transformation, to form a signal pulse sequence; the second optical pulse sequence or a part of it is passed through the power amplification, the power control, the pulse waveform conversion, the polarization control, the beam splitter or the frequency doubling transformation, to form a reference pulse sequence;

The third step, the signal pulse sequence and the reference pulse sequence are incident on the device under test in a collinear or non-collinear configuration, by measuring the signal pulse sequence with a photodetector, an asynchronous sampling signal related to the pump probe signal is obtained;

The fourth step, by means of the data processing of the asynchronous sampling signal, the time axis conversion relationship between the terahertz time-domain signal and the asynchronous sampling signal is $\Delta T = \Delta \tau \Delta f / f_1$, where $\Delta \tau$ is the temporal position of the asynchronous sampling signal, and $\Delta T$ is the temporal position of the pump probe signal.

3. In an example, in step 2, the first optical pulse sequence is input to the device under test after going through the power amplification, the pulse waveform conversion, the polarization control and the spectral shift, to form a signal pulse sequence; while the second optical pulse sequence is transformed into a reference pulse sequence through the power amplification, the pulse waveform conversion, the polarization control; in step 3, the time domain correlation signal is generated between the reference pulse sequence and the signal pulse sequence; in step 4, after the data processing of the signal, the time domain spectroscopy information of the device under test can be obtained.

Specifically, the asynchronous sampling signal measurement method described above for the time domain spectroscopy measurement includes:

The first step, the pulsed light source generates optical pulse sequences with more than two different repetition frequencies, which can be split into the first optical pulse sequence with the repetition frequency of $f_1$ and the second optical pulse sequence with the repetition frequency of $f_2$ after the pulse beam splitting, the repetition frequency difference between the first optical pulse sequence and the second optical pulse sequence is $\Delta f = |f_1 - f_2|$.

The second step, the first optical pulse sequence or a part of it is passed through the power amplification, the power control, the pulse waveform conversion, the polarization control, resulting in the spectral transformation, and is further passed through the device under test to form a signal pulse sequence; the second optical pulse sequence or a part of it is passed through the power amplification, the power control, the pulse waveform conversion, the polarization control, the spectral transformation, to form a reference pulse sequence;

The third step, the signal pulse sequence and the reference pulse sequence are incident upon the photodetector, the output of the photodetector gives the asynchronous sampling signal.

The fourth step, by means of the data processing of the asynchronous sampling signal, the time axis conversion relationship between the terahertz time-domain signal and the asynchronous sampling signal is $\Delta T = \Delta \tau \Delta f / f_1$, where $\Delta \tau$ is the temporal position of the asynchronous sampling signal, $\Delta T$ is the temporal position of the time domain signal, furthermore, through the signal transformation between the time domain and the frequency domain, the time-domain spectroscopy information can be obtained.

Specifically, the reason that the first optical pulse sequence described above can be spectrally shifted to have an overlapped spectral range with the reference pulse sequence.

4. In an example, in step 2, the first optical pulse sequence can be split into two branches after going through the power control, the pulse waveform conversion, the polarization control and/or the wavelength shift, one of them can be passed through the calibration optical path to generate a calibration pulse sequence, the other can be passed through the target optical path to generate a target pulse sequence. The calibration pulse sequence and the target pulse sequence merge into the signal pulse sequence. The second optical pulse sequence, after going through the power control, the pulse waveform conversion, the polarization control and/or the wavelength shift to form a reference pulse sequence; in step 3, a field correlation signal or an intensity correlation signal between the reference pulse sequence and the signal pulse sequence can be obtained; in step 4, according to the above obtained signal, the time difference between the target pulse and the closest calibration pulse before it in the signal pulse sequence can be calculated to get the optical distance difference between the target optical path and the calibration optical path.

Specifically, the asynchronous sampling signal measurement method described above for the optical path measurement includes:

The first step, the pulsed light source generates optical pulse sequences with more than two different repetition frequency, which can be split into the first optical pulse sequence with the repetition frequency of $f_1$ and the second optical pulse sequence with the repetition frequency of $f_2$ after the pulse beam splitting, where the repetition frequency difference between the first optical pulse sequence and the second optical pulse sequence is $\Delta f = |f_1 - f_2|$.

In the second step, the first optical pulse sequence can be passed through the calibration optical path to generate a calibration pulse sequence, the first optical pulse sequence is then passed through the target optical path to generate a target pulse sequence, and the calibration pulse sequence and the target pulse sequence merge into the signal pulse sequence;

The third step, measures the field correlation signal or the intensity correlation signal generated between the signal pulse sequence and the reference pulse sequence;

The fourth step, according to the time domain correlation signal, the time difference between the target pulse and the closest calibration pulse before it in the signal pulse sequence can be calculated to get the optical distance difference between the target optical path and the calibration optical path.

Hereto, when the time domain correlation signal is the field correlation signal between the reference optical pulse sequence and the signal optical pulse sequence, the first optical pulse sequence and/or the second optical pulse sequence go through the wavelength shift to make the spectra of the reference pulse sequence and the signal pulse sequence have a good overlap.

Hereto, the first optical pulse sequence can be incident on a calibration surface to generate the calibration pulse sequence by the reflection from the calibration surface; and the first optical pulse sequence can be incident on a target surface to generate the target pulse sequence by the reflection from the target surface.

Hereto, the first optical pulse sequence could be passed through a calibration delay to generate the calibration pulse sequence, and the first optical pulse sequence could be passed through a target delay to generate the target pulse sequence.

In the fourth step, calculate the optical distance according to the following formula: $d = v_g (\Delta\tau \Delta f/f_p + n/f_p)$, where d is the optical distance difference between the target optical path and the calibration optical path, $v_g$ is the group velocity of the signal optical pulse, $\Delta f$ is the repetition frequency difference between the first optical pulse sequence and the second optical pulse sequence, $f_1$ is the repetition frequency of the first optical pulse sequence, $\Delta\tau$ is the actual measured time difference between the target pulse and the closest calibration pulse before the target pulse in the time domain correlation signal, n is an integer, and $n v_g / f_p$ is the ambiguity range.

5. In an example, in step 2, the first optical pulse sequence can be split into two branches after going through the power controller, the pulse waveform conversion and the polarization controller. One of the branches can be passed through the calibration optical path to generate a calibration pulse sequence, the other branch can be passed through the target optical path to generate a target pulse sequence, and then the calibration pulse sequence and the target pulse sequence can be merged into a signal pulse sequence. The second optical pulse sequence can be passed through the power control, the pulse waveform conversion and the polarization control to form a reference pulse sequence; in step 3, the signal pulse sequence and the reference pulse sequence are input into a pulse interaction device, in which the characteristics of the pulse in the signal pulse sequence that overlaps with a pulse of the reference pulse sequence in the time domain experiences a change, and then the signal pulse sequence can be measured to give an asynchronous sampling signal; in step 4, according to the temporal position of the pulse in the asynchronous sampling signal, whose characteristics are changed, the time difference between the target pulse and the closest calibration pulse in front of the target pulse in the signal pulse sequence can be calculated to get the optical distance difference between the target optical path and the calibration optical path.

Specifically, the asynchronous sampling signal measurement method described above for the optical path measurement includes:

The first step, the pulsed light source generates optical pulse sequences with more than two different repetition frequencies, which are split into the first optical pulse sequence with the repetition frequency of $f_1$ and the second optical pulse sequence with the repetition frequency of $f_2$ after the pulse beam splitting. The repetition frequency difference between the first optical pulse sequence and the second optical pulse sequence is $\Delta f = |f_1 - f_2|$.

In the second step, the first optical pulse sequence can be split into two branches and passed through the power controller, the pulse waveform conversion, and the polarization controller. One of the branches can be passed through the calibration optical path to generate a calibration pulse sequence, the other branch can be passed through the target optical path to generate a target pulse sequence. The calibration pulse sequence and the target pulse sequence merge into a signal pulse sequence. The second optical pulse sequence can be passed through the power control, the pulse waveform conversion and the polarization control to form a reference pulse sequence;

In the third step, the signal pulse sequence and the reference pulse sequence are sent into the pulse interaction device, in which the characteristics of the pulse from the signal pulse sequence which can be overlapped in the time domain with a pulse from the reference pulse sequence experience a change, and then measuring the signal pulse sequence to provide the asynchronous sampling signal;

The fourth step, according to the asynchronous sampling signal, the time difference between the target pulse and the closest calibration pulse before the target pulse in the signal pulse sequence can be calculated to give the optical distance difference between the target optical path and the calibration optical path.

In the fourth step, the optical path can be calculated according to the following formula:

$$d = v_g(\Delta\tau \Delta f/f_p + n/f_p),$$

where d is the optical distance difference between the target optical path and the calibration optical path, $v_g$ is the group velocity of the signal optical pulse, $\Delta f$ is the repetition frequency difference between the first optical pulse sequence and the second optical pulse sequence, $f_1$ is the repetition frequency of the first optical pulse sequence, $\Delta\tau$ is the actual measured time difference between the target pulse and the closest calibration pulse before the target pulse in the time domain correlation signal, n is an integer, and $nv_g/f_p$ is the ambiguity range.

The application provides an apparatus for optical asynchronous sampling signal measurement, whose characteristics comprise:

The pulsed light source generates optical pulse sequences with different repetition frequencies, one with the repetition frequency of $f_1$ is called the first optical pulse sequence, one with the repetition frequency of $f_2$ is called the second optical pulse sequence;

The signal light path can be used to transform the first optical pulse sequence into a signal pulse sequence;

The reference light path can be used to transform the second optical pulse sequence into a reference pulse sequence;

The detection device can be used to realize the interaction between the signal pulse sequence and the reference pulse sequence and obtain an asynchronous sampling signal.

In an example, the pulsed light source contains only one resonant cavity, by means of the modal dispersion, the polarization mode dispersion, the birefringence or the chromatic dispersion in the cavity, and it can realize simultaneously emitting optical pulse sequences with two different repetition frequencies.

The measuring apparatus can be applied in the following five examples, respectively for terahertz signal measurement, pump-probe signal measurement, time-domain spectroscopy measurement, optical distance measurement based on correlation signal measurement, and optical distance measurement based on non-correlation signal measurement:

1. In an example, the signal light path includes an optical power amplifier, a dispersion control device, a polarization control device, a frequency doubling crystal, a terahertz emission device and a device under test; where the reference light path includes an optical power amplifier, a dispersion control device, a polarization controller and a frequency doubling crystal; and the detection device comprises a terahertz receiver composed of an electro-optic device and a photodetector, or composed of a photoconductive switch.

Specifically, the asynchronous sampling signal measurement apparatus described above for the terahertz signal measurement includes:

The pulsed light source outputs optical pulse sequences with more than two different repetition frequencies;

The pulse splitting and processing device, including an optical fiber coupler, a beam splitter prism, a beam splitter, the optical filter, a band-pass filter or a wavelength division multiplexer, can be used to divide the first optical pulse sequence and the second optical pulse sequence generated by the pulsed light source into two branches;

The signal light path, including an optical power amplifier, a dispersion control device, a polarization control device, a frequency doubling crystal, converts the first optical pulse sequence into a pump optical pulse sequence. The signal light path also includes the terahertz emission device, such as an electro-optic device, a photoconductive switch device or a surface effect device that radiates terahertz wave. The signal light path also can include the device under test;

The reference light path, including an optical power amplifier, a dispersion control device, a polarization control device, a frequency doubling crystal, converts the second optical pulse sequence into a reference pulse sequence;

The detection device, including a terahertz receiver composed of an electro-optic device and a photodetector, or composed of a photoconductive switch, wherein the electro-optic device includes InAs, GaAs, InSb, ZnTe, LiTaO$_3$, DAST, electro-optic polymer materials and etc., the photodetector can be a PIN detector, an APD detector, a photomultiplier tube or a balanced detector.

In the optical asynchronous sampling signal measurement apparatus for the terahertz signal measurement, the wavelengths of the pump optical pulse sequence and the reference optical pulse sequence can be the same or different. The wavelengths of the pump optical pulse sequence and the reference optical pulse sequence can be the same as the wavelength of a pulse sequence in the output signal of the pulsed light source, or can be converted from the wavelength of a pulse sequence of the pulsed light source output to another wavelength, but the repetition frequency of the pump optical pulse sequence and that of the reference optical pulse sequence must be different, where the repetition frequencies are an integer multiple times of each other.

2. In one example, the signal light path includes an optical power amplifier, a dispersion control device, a polarization control device and/or a frequency doubling crystal; the reference light path includes an optical power amplifier, a dispersion control device, a polarization controller and/or a frequency doubling crystal; the detection device comprises a device under test, a filtering device and a photodetector.

Specifically, the asynchronous sampling signal measurement apparatus described above for the pump detection signal measurement includes:

The pulsed light source emits optical pulse sequences with more than two different repetition frequencies, where the different repetition frequencies are not an integer multiple of each other.

The signal light path, including an optical power amplifier, a dispersion control device, a polarization control device, a frequency doubling crystal, converts the first optical pulse sequence into a signal pulse sequence.

The reference light path, including an optical power amplifier, a dispersion control device, a polarization control device, a nonlinear optical device, converts the second optical pulse sequence into a reference pulse sequence;

The detection device, including a device under test, a filtering device and a photodetector, wherein the filtering device can be the devices with the filtering effect like an optical filter, a band-pass filter or a wavelength division multiplexer, a polarizing beam splitter cube or a polarizer with the analyzer function; wherein the photodetector includes a PIN detector, an APD detector, a photo multiplier tube or a balanced detector.

3. In one example, the signal light path includes an optical power amplifier, a dispersion control device, a polarization control device, a device under test, and a nonlinear optical device; the reference light path includes an optical power amplifier, a dispersion control device, a polarization controller; and the detection device comprises a filter and a photodetector.

Specifically, the asynchronous sampling signal measurement apparatus for the time domain spectroscopy signal measurement described above includes:

The pulsed light source outputs optical pulse sequences with more than two different repetition frequencies.

The signal light path, including an optical power amplifier, a dispersion control device, a polarization controller, a device under test, and a nonlinear optical device, converts the first optical pulse sequence into a signal pulse sequence; wherein the function of the nonlinear optical device is to transform the spectrum of the signal pulse sequence so that it has an overlap with the spectrum of the reference pulse sequence;

The reference light path, including an optical power amplifier, a dispersion control device, a polarization control device, converts the second optical pulse sequence into a reference pulse sequence;

The detection device includes a filtering device and a photodetector.

4. In one example, the signal light path includes an optical power amplifier, a dispersion control device, a polarization control device, a nonlinear optical device, a calibration path and a target path; the reference light path includes an optical power amplifier, a dispersion control device, a polarization controller and/or a nonlinear optical device; where the detection device includes a frequency doubling crystal, a filtering device and a photodetector.

Specifically, the optical asynchronous sampling signal measurement apparatus described above for the optical distance measurement, depending upon whether the measured signal is a field correlation signal or an intensity correlation signal, in the following two different but similar configurations of the apparatuses are feasible and could be presented in the following:

The first apparatus can be based to measure the optical distance by measuring the field correlation signal, which needs the signal pulse sequence and the reference pulse sequence to be spectrally overlapped, including:

The pulsed light source outputs an optical pulse sequence with more than two different repetition frequencies;

The signal light path includes an optical power amplifier, a dispersion control device, a polarization control device, a nonlinear optical device, a calibration path and a target path, wherein the nonlinear optical device can broaden or shift the spectra of the first optical pulse sequence, and some new spectral components can be created, so that the spectrum of the signal pulse sequence and the spectrum of the reference pulse sequence overlap;

The reference light path includes an optical power amplifier, a dispersion control device, a polarization control device, a nonlinear optical device, wherein the nonlinear optical device can broaden or shift the spectrum of the second optical pulse sequence, and generate some new spectral components, so that the spectrum of the reference pulse sequence and the spectrum of the signal pulse sequence overlap;

The detection device includes a filtering device and a photodetector.

The second apparatus can be used to measure the intensity correlation signal by measuring the optical path, which does not need the spectrum of the signal pulse sequence and the spectrum of the reference pulse sequence to overlap. The second apparatus includes:

The pulsed light source outputs an optical pulse sequence with more than two different repetition frequencies.

The signal light path includes an optical power amplifier, a dispersion control device, a polarization control device, a calibration path and a target path;

The reference light path includes an optical power amplifier, a dispersion control device, a polarization control device;

The detection device includes a frequency doubling crystal with a PIN detector, an APD detector or a frequency doubling detector composed of the photomultiplier tube or a two-photon-absorption photodetection device.

5. In an example, characterized in that, the signal light path includes an optical power amplifier, a dispersion control device, a polarization control device, a calibration path and a target path; the reference light path includes an optical power amplifier, a dispersion control device, a polarization control device; where the detection device includes a pulse interaction device, a filtering device and a photodetector.

Specifically, the above can be the optical asynchronous sampling, signal measurement system, whose goal is to measure the optical distance. The apparatus described above can be used for the optical path measurement. The measured asynchronous sampling signal is no longer the correlation signal between the reference pulse sequence and the signal pulse sequence. The apparatus includes:

The pulsed light source outputs optical pulse sequences with more than two different repetition frequencies;

The signal light path includes an optical power amplifier, a dispersion control device, a polarization control device, a nonlinear optical device, a calibration path and a target path;

The reference light path includes an optical power amplifier, a dispersion control device, and a polarization control device.

The detection device includes a pulse interaction device, a filtering device and a photodetector.

In one example, characterized in that, the pulse device includes a semiconductor optical amplifier, a saturable absorber, an all-optical switch and an all-optical logic gate.

The application provides a method for generating a multi frequency optical comb, including:

Step 1, the pulsed laser outputs two or more than two optical pulse sequences with different center wavelengths and different repetition rates, where the maximum value of the full width at half maximum of the adjacent optical pulse sequences with different center wavelengths in the spectrum is less than the difference of the two center wavelengths;

Step 2, the optical pulse sequence with different center wavelengths and different repetition rates emitted by the pulsed laser can be passed through the nonlinear optical process to make the spectra of the optical pulse sequences with one or more different center wavelengths broaden and overlap, so that it has an optical comb with more than two kinds of different repetition frequencies in the wavelength region, where the spectra overlap.

In an example, in step 2, the optical pulse sequence with different center wavelengths and different repetition rates can be broadened together through an element, which can achieve a nonlinear optical process, to broaden the spectrum, so that the spectrum of the first optical pulse sequence and the second optical pulse sequence overlap after broadening.

In an example, the step 2 can be further divided into:

Step 21, the optical pulse sequence output by the pulsed laser can be split into the first optical pulse sequence and the second optical pulse sequence by the optical splitting device, the center wavelength of the first optical pulse sequence is the first wavelength, the repetition frequency of the first optical pulse sequence is the first frequency, the center wavelength of second optical pulse sequence is the second wavelength, the repetition frequency of the second optical pulse sequence is the second frequency;

Step 22, the first optical pulse sequence and/or the second optical pulse sequence can be broadened respectively after going through the nonlinear optical process to make the spectrum broader, so that the spectrum of the first optical pulse sequence and that of the second optical pulse sequence overlap after broadening.

In one example, the nonlinear optical process is based on the four-wave mixing, the self-phase modulation, the cross-phase modulation, the stimulated Raman scattering effect or their combinations thereof.

The application provides a multi-frequency optical comb apparatus, including:

A pulsed laser output with more than two kinds of optical pulse sequences each with different central wavelengths, where the maximum value of the full width at half maximum of the optical pulse sequences with different center wavelengths is less than the difference of the center wavelengths, and the average group velocity in the pulsed laser cavity is not the same for the different center wavelengths, so that the repetition frequency of the optical pulse sequences with different center wavelengths is different;

The optical pulse sequence emitted by the pulsed laser can be passed through the nonlinear optical apparatus to broaden the spectrum of the optical pulse sequence with one or more different center wavelengths, so that the spectra of the optical pulse sequences with different center wavelengths overlap after broadening.

In an example, the nonlinear optical apparatus includes:

The optical splitter divides the optical pulse sequence output by the pulsed laser into many optical pulse sequences, the center wavelengths of each of which are different, and the value of the full width at half maximum of the spectra is less than the difference of the adjacent center wavelengths;

The nonlinear optical device broadens the spectra of the optical pulse sequences with one or more different center wavelengths, so that the spectra of the optical pulse sequences with different center wavelengths could overlap after broadening.

In an example, the shape of the pulsed laser cavity can be a linear cavity, a folded cavity, a ring cavity or an "8" shape cavity.

In an example, the pulsed laser can be an active mode-locked laser, a passive mode-locked laser or a mixed mode locked laser.

In an example, the nonlinear optical device can be single-mode optical fiber, a high nonlinear optical fiber, Optical fiber, a photonic crystal fiber or a nonlinear integrated optical waveguide.

In an example, the optical splitting device can be an optical fiber coupler, a beam splitter prism, a beam splitter, an optical filter, a band-pass filter or a wavelength division multiplexer.

DESCRIPTION OF THE FIGURES

Below with reference to the figures, the application will be described in further detail, in which.

EXAMPLES

In the optical asynchronous sampling signal measurement apparatus, the pulsed light source contains only one optical resonant cavity, and optical pulses with two repetition frequencies are produced by the same resonant cavity. Because these two pulse sequences possess different modes, different polarization states, different central wavelengths or other different characteristics, using the modal dispersion, the polarization mode dispersion, the birefringence or the chromatic dispersion of the related devices in the resonant cavity, one resonant cavity can emit optical pulse sequence with two different repetition frequencies. In the examples below, a pulsed light source can be a mode-locked laser, based on the chromatic dispersion in the optical cavity, it is realized that one pulsed light source emits pulse sequences with two different wavelengths and, thus, different repetition frequencies. In addition, a continuous-wave (CW)-laser-pumped microring resonator can also be used as the pulsed light source to produce an optical frequency comb using the optical Kerr effect, by leveraging the slight difference of the refractive indices of the microring resonator which can also be added into the optical resonant cavity, to achieve a pulsed light source which emits optical pulse sequences with different repetition frequencies based on the birefringence dispersion.

The pulse light source used in the following examples from the first to the seventh is a dual-wavelength mode-locked laser, which uses erbium-doped fiber as the gain medium, and adjusts the intracavity gain spectrum by controlling the intracavity loss to realize the output of the dual-wavelength pulse laser at 1530 nm and 1560 nm. Because of the chromatic dispersion of the fiber or other devices in the fiber cavity, the group velocities of the two wavelengths are different, and the repetition frequencies of the pulses at the two wavelengths are different. Assuming the repetition frequency of the pulse sequence with 1530 nm wavelength is $f_1$, and the repetition frequency of the pulse sequence with 1560 nm wavelength is $f_2$, the frequency difference is $\Delta f$.

Example 1

Figure 1:
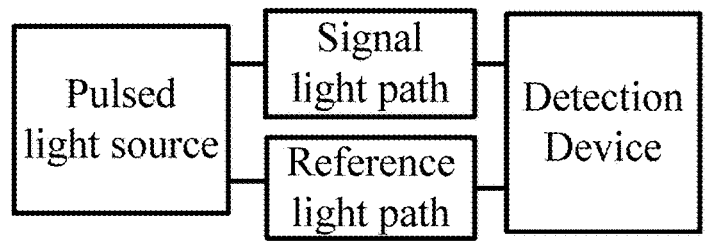
FIG. 1 is a schematic diagram showing an optical asynchronous sampling signal measurement apparatus.
Figure 2:
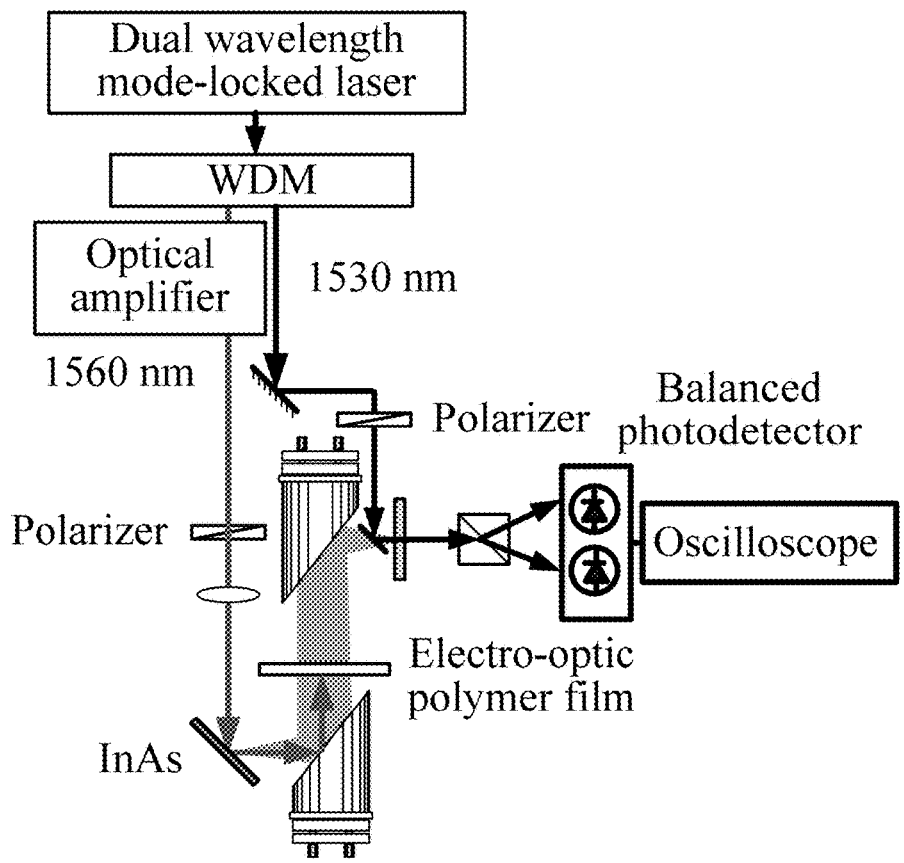
FIG. 2 is a schematic diagram showing a first optical asynchronous sampling signal measurement apparatus for terahertz signal measurement.

The optical asynchronous sampling signal measurement apparatus using the dual wavelength mode-locked laser for the terahertz signal measurement is shown in FIG. 2. Through a wavelength division multiplexer (WDM), the pulses with the center wavelength of 1530 nm and 1560 nm from the dual-wavelength mode-locked laser can be separated. The light pulse with the center wavelength of 1560 nm can be passed through the optical power amplifier to realize the power amplification and the pulse compression, and passed through a polarization control device to generate a horizontal-polarized pump pulse sequence. The light pulse with the center wavelength of 1530 nm can be passed through the polarization control device to generate a 45-degree linear-polarized, reference pulse sequence.

The pump optical pulse sequence can be incident at an angle of 45 degree upon the terahertz emission device—a piece of InAs crystal under external magnetic field based on the magnetic-field-enhanced Dember effect, to radiate the terahertz signal in the direction of reflection. After being collimated by the first off-axis parabolic mirror, the terahertz beam transmits a distance through the device under test and the air, and becomes the signal pulse sequence. Then after being focused by the second off-axis parabolic mirror, the signal pulse sequence and the reference pulse sequence are incident upon the terahertz receiving device—an electro-optic polymer film. After passing through the electro-optic polymer film, the signal pulse sequence can be incident onto the Wollaston prism and can be divided into two beams. These two light beams can be directed onto two probes of a balanced photodetector, and the asynchronous sampling signal from the balanced photodetector can be measured by an oscilloscope. The actual time step of the signal is $\Delta f/f_2$ times the original time step on the oscilloscope, and this yields the terahertz time-domain signal, and via the Fourier transform, the terahertz time-domain spectroscopy information can be obtained.

Example 2

Figure 3:
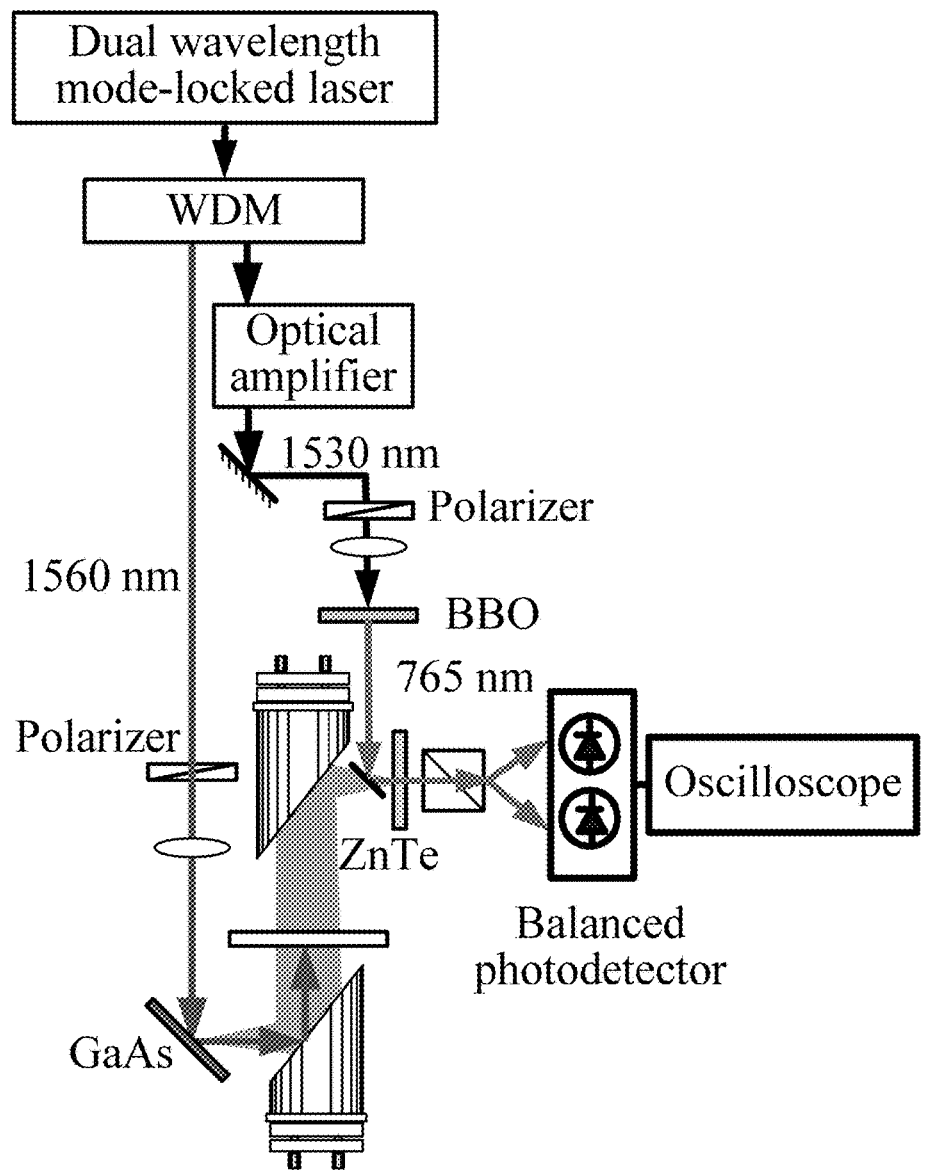
FIG. 3 is a schematic diagram showing a second optical asynchronous sampling signal measurement apparatus for terahertz signal measurement.
Figure 4:
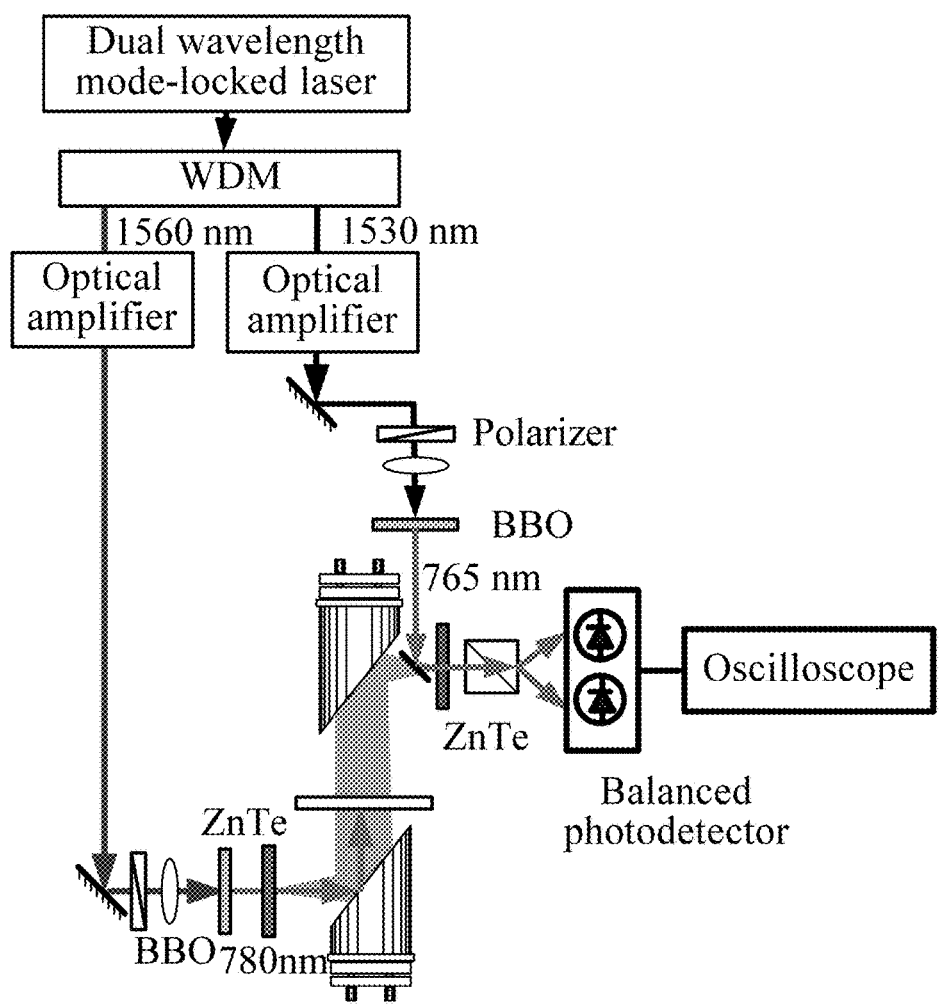
FIG. 4 is a schematic diagram showing a third optical asynchronous sampling signal measurement apparatus for terahertz signal measurement.

The optical asynchronous sampling signal measurement apparatus using the dual-wavelength mode-locked laser for the terahertz signal measurement is shown in FIG. 3. Through a wavelength division multiplexer, the pulses with the center wavelength of 1530 nm and 1560 nm from the dual-wavelength mode-locked laser can be separated. The light pulse with the center wavelength of 1560 nm is passed through the polarizer to generate a horizontal-polarized pump pulse sequence. The light pulse with the center wavelength of 1530 nm is passed through the optical power amplifier and the standard single mode optical fiber with the nonlinear optical effect to realize the power amplification and pulse compression, which is further incident on a frequency doubling BBO crystal to generate the frequency doubling light at 765 nm as the reference pulse sequence.

The pump optical pulse sequence is incident at an angle of 45 degree upon the terahertz emission device—the GaAs crystal, and radiates the terahertz wave by the optical rectification effect. After being collimated by the first off-axis parabolic mirror, the terahertz beam transmits through the device under test and the air and becomes the signal pulse sequence. Then after being focused by the second off-axis parabolic mirror, the signal pulse sequence and the reference pulse sequence are incident upon the terahertz receiving device—ZnTe crystal. Through the method of the electro-optic sampling we can detect the terahertz signal. After passing through the ZnTe crystal, the signal pulse sequence incident to a Wollaston prism can be divided into two beams, and these two beams are incident to the two probes of a balanced photoelectric detector, respectively, and the asynchronous sampling signal from the balanced photodetector can be measured by an oscilloscope. The actual time step of the signal is $\Delta f/f_2$ times the original time step on the oscilloscope, and this yields the terahertz time-domain signal, and through the Fourier transform, the terahertz time-domain spectroscopy information is obtained.

Example 3

The optical asynchronous sampling signal measurement apparatus using the dual-wavelength mode-locked laser for the terahertz signal measurement is shown in FIG. 3. Through a wavelength division multiplexer, the pulses with the center wavelength of 1530 nm and 1560 nm from the dual-wavelength mode-locked laser is separated. The light pulse with the center wavelength of 1560 nm is passed through the optical power amplifier and the standard single mode optical fiber with the nonlinear optical effect to realize the power amplification and pulse compression, and is further incident on a frequency doubling crystal BBO crystal to generate the frequency doubling light at 780 nm as the pump light pulse sequence. The light pulse with the center wavelength of 1530 nm is passed through the optical power amplifier and the standard single mode optical fiber with the nonlinear optical effect to realize the power amplification and pulse compression, and is further incident on a frequency doubling crystal BBO to generate the frequency doubling light at 765 nm as the reference pulse sequence.

The pump optical pulse sequence is incident at the terahertz emission device—the ZnTe photoconductivity switching and radiates the terahertz wave. After being collimated by the first off-axis parabolic mirror, the terahertz beam transmits through the test device and the air and becomes the signal pulse sequence. Then after being focused by the second off-axis parabolic mirror, the signal pulse sequence and the reference pulse sequence are both incident upon the terahertz receiving device—the ZnTe photoconductivity switching. Through the method of the electro-optic photoconductivity sampling we can detect the terahertz signal. After passing through the ZnTe photoconductivity, the signal pulse sequence incident to a Wollaston prism and can be divided into two beams, and these two light beams are incident to the two probes of the balanced photoelectric detector, respectively, and the asynchronous sampling signal from the balanced photodetector can be measured by an oscilloscope. The actual time step of the signal is $\Delta f/f_2$ times the original time step on the oscilloscope, and this yield the terahertz time-domain signal, and through the Fourier transform, the terahertz time-domain spectroscopy information is obtained.

Example 4

Figure 5:
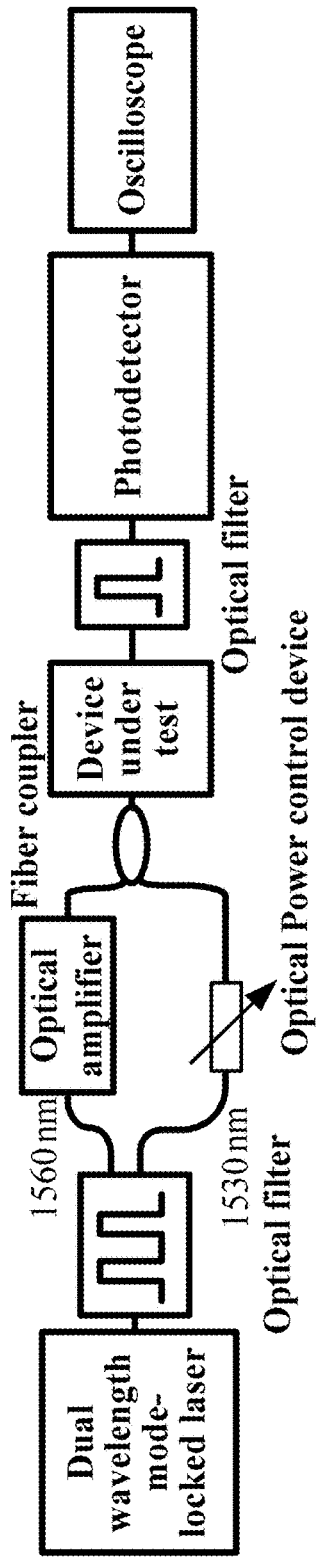
FIG. 5 is a schematic diagram showing a first optical asynchronous sampling signal measurement apparatus for pump-probe signal measurement.

The optical asynchronous sampling signal measurement apparatus using the dual-wavelength mode-locked laser for the pump-probe measurement is shown in FIG. 5. Through an optical filter, the pulses of different repeat frequencies with the center wavelength of 1530 nm and 1560 nm from the dual-wavelength mode-locked laser is separated. The light pulse with the center wavelength of 1560 nm is passed through the optical power amplifier to realize the power amplification and pulse compression and generate a reference pulse sequence. The light pulse with the center wavelength of 1530 nm is passed through the power control device to generate a signal pulse sequence. The signal pulse sequence and the reference pulse sequence can be merged into one beam by the fiber coupler, then incident on the device under test and output the light signal. The light signal is passed through the optical filter to get the signal pulse sequence filtered, which is detected by the photodetector to generate the asynchronous sampling signal. The asynchronous sampling signal is measured by the oscilloscope and the actual time step of the signal is $\Delta f/f_1$ times the original time step on the oscilloscope, this yield pump probe signal.

Example 5

Figure 6:
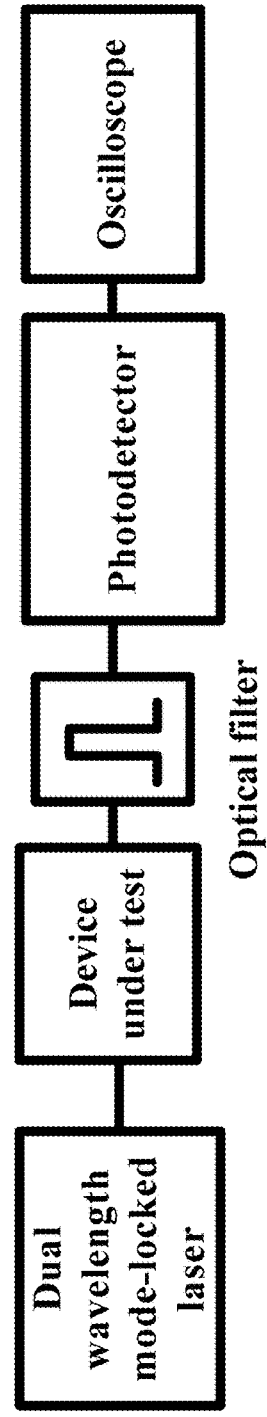
FIG. 6 is a schematic diagram showing a second optical asynchronous sampling signal measurement apparatus for pump-probe signal measurement.

The optical asynchronous sampling signal measurement apparatus using the dual wavelength mode-locked laser for the pump-probe measurement is shown in FIG. 6. The pulses of different repeat frequencies from the dual-wavelength mode-locked laser incident on the device under test together. The light pulse with the center wavelength of 1560 nm is the reference pulse sequence and the light pulse with the center wavelength of 1530 nm is the signal pulse sequence. The light signals which pass through the device under test input into the optical filter to filter out the signal pulse sequence, which is detected by the photodetector and then measured by the oscilloscope to get the asynchronous sampling signal. The actual time step of the signal is $\Delta f/f_1$ times the original time step on the oscilloscope and yield pump probe signal.

Example 6

Figure 7:
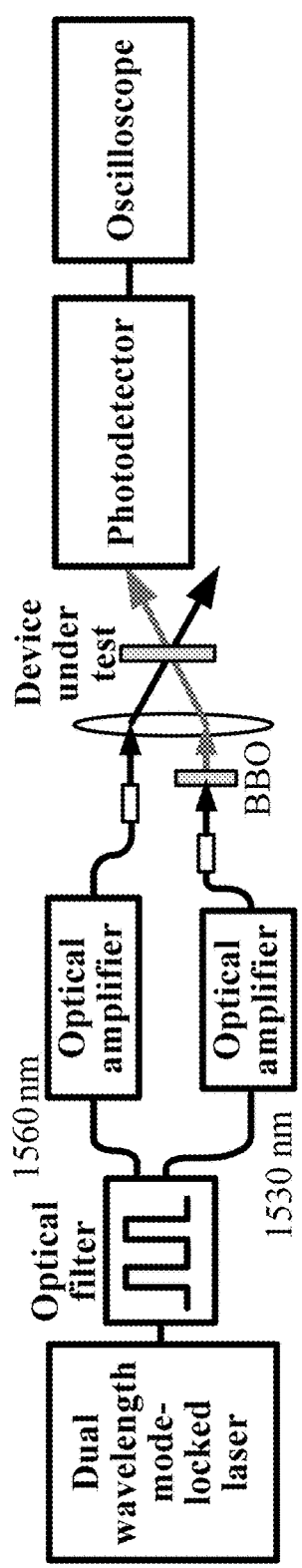
FIG. 7 is a schematic diagram showing a third optical asynchronous sampling signal measurement apparatus for pump-probe signal measurement.
Figure 8:
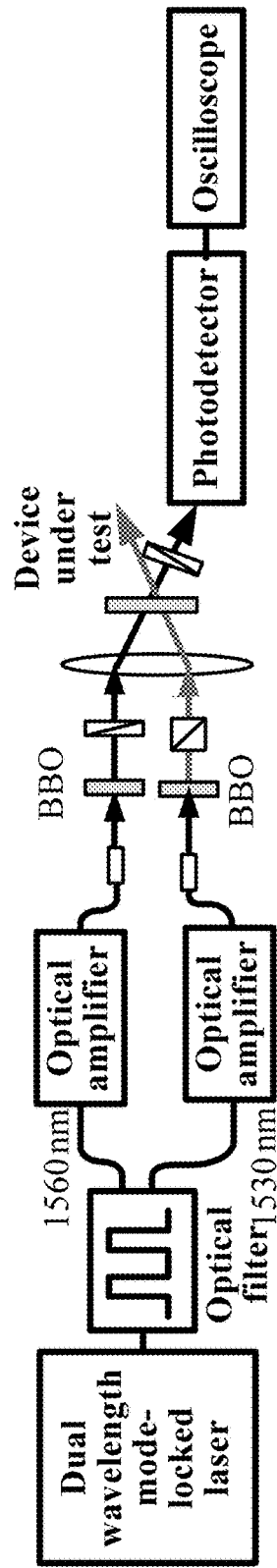
FIG. 8 is a schematic diagram showing a fourth optical asynchronous sampling signal measurement apparatus for pump-probe signal measurement.
Figure 9:
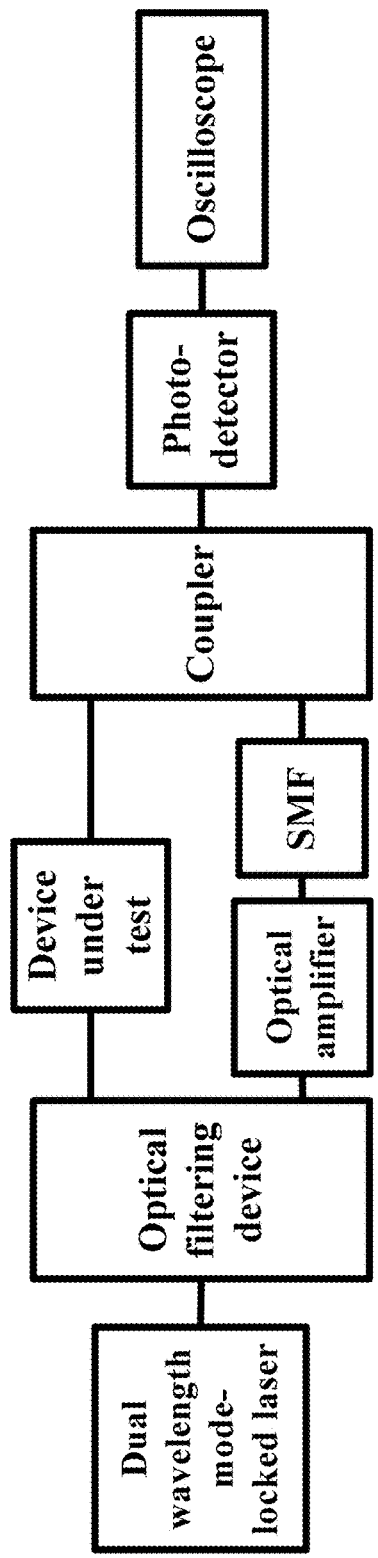
FIG. 9 is a schematic diagram showing an optical asynchronous sampling signal measurement apparatus for time domain spectroscopy measurement.

The optical asynchronous sampling signal measurement apparatus using the dual wavelength mode-locked laser for the pump-probe measurement is shown in FIG. 7. Through an optical filter, the pulses of different repeat frequencies with the center wavelength of 1530 nm and 1560 nm from the dual-wavelength mode-locked laser is separated. The light pulse with the center wavelength of 1560 nm is passed through the optical power amplifier to realize the power amplifier and pulse compression and generate a reference pulse sequence. The light pulse with the center wavelength of 1530 nm is passed through the optical power amplifier to realize the power amplifier and pulse compression, and is further incident on a frequency doubling crystal BBO to generate the frequency doubling light at 780 nm as the signal pulse sequence. The non-collinear signal pulse sequence and reference pulse sequence focus on the device under test through an optical lens, then the signal pulse sequence is detected by the photodetector to get the asynchronous sampling signal. The actual time step of the signal is $\Delta f/f_1$ times the original time step on the oscilloscope and yield pump probe signal.

Example 7

The optical asynchronous sampling signal measurement apparatus using the dual-wavelength mode-locked laser for the pump-probe signal measurement is shown in FIG. 7. Through an optical filter, the pulses of different repeat frequencies with the center wavelength of 1530 nm and 1560 nm from the dual-wavelength mode-locked laser is separated. The light pulse with the center wavelength of 1530 nm is passed through the optical power amplifier to realize the power amplification and pulse compression, and is further incident on a frequency doubling crystal BBO to generate the frequency doubling signal at 765 nm. The light is passed through a polarized beam splitter prism to be horizontal polarized and became a reference pulse sequence. The pulse light with the center wavelength of 1560 nm is passed through the optical power amplifier to realize the power amplification and pulse compression, and is further incident on the frequency doubling crystal BBO to generate the 780 nm light which is passed through a polarizer to be 45 degree linear polarized and become a signal pulse sequence. The non collinear signal pulse sequence and reference pulse sequence are passed through the lens to focus on the device under test. The signal pulse sequence is passed through the analyzer whose polarization direction is vertical to the polarizer and then measured by the oscilloscope. The actual time step of the signal is $\Delta f/f_1$ times the original time step on the oscilloscope and yield pump probe signal.

Example 8

The pulsed light source in this example is a dual-wavelength, dual frequency pulse laser, which outputs two optical pulse sequences with different repetition frequencies, where the frequency difference is 472 Hz, and the center wavelengths are 1532 nm and 1555 nm respectively. Through an optical filter, the pulses of different repeat frequencies with the center wavelength of 1532 nm and 1555 nm from the dual-wavelength mode-locked laser is separated. The optical pulse sequence with the center wavelength of 1555 nm is the first optical pulse sequence, which is passed through the device under test to generate a signal pulse sequence. The optical pulse sequence with the center wavelength of 1532 nm is the second optical pulse sequence, which is passed through the optical amplifier and the standard single-mode fiber to realize the spectral broadening and become the reference pulse sequence. Its spectrum is overlapped with the spectrum of signal pulse sequence. The signal pulse sequence and the reference pulse sequence merge in the coupler, and then detected by the photodetector to output the electric signal in the time domain. The spectroscopy information can be obtained after the time axis transform and the time to frequency domain transform. In this example, either optical pulse sequence can have the spectrum overlapped with another through the spectrum broadening.

Example 9

The pulsed light source used in this example is a dual-wavelength mode-locked laser. The principle of dual wavelength output is tuning the shape of the gain spectrum of the erbium doped fiber through controlling the intracavity loss, so that the gain at different wavelength is the same and to realize dual wavelength mode-locked pulse.

Figure 10:
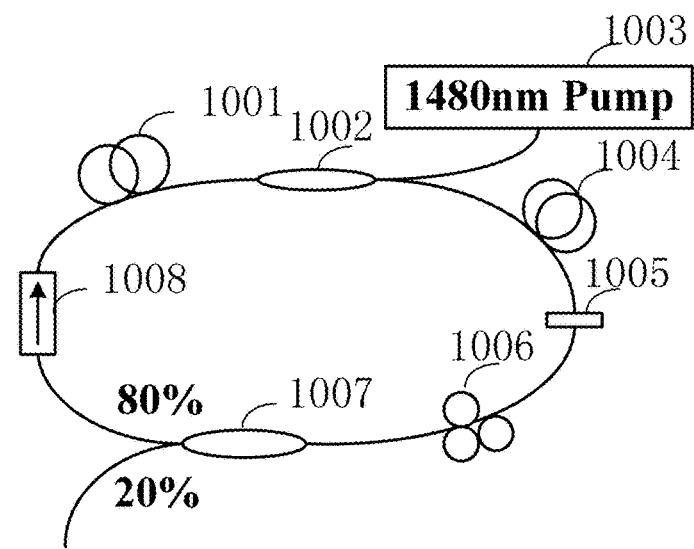
FIG. 10 is a schematic diagram showing a dual-wavelength pulse laser apparatus.

The structure of the laser is shown in FIG. 10, which is a passively mode locked fiber laser with the ring cavity structure. The pump light source is a semiconductor laser 1003 of 1480 nm wavelength. The pump light is coupled into the erbium doped fiber (EDF) 1001 through the 1480/1550 wavelength division multiplexer 1002. The EDF is 5 meters long and its absorption coefficient at 1530 nm is 6.1 dB/m. The EDF is connected with the optical isolator 1008 to ensure the unidirectional transmission of the light in the fiber cavity. The polarization controller 1006 in the cavity is used to control the polarization state. The mode locked device is the carbon nanotube/polyimide film 1003 and the thickness of the film is 45 microns. The loss of the mode locked device is about 4 dB when the film is sandwiched between two FC/PC connectors.

In order to ensure the anomalous average dispersion in the cavity to generate soliton pulse, a 6.85 m standard single-mode optical fiber 1004 (including all pigtailed devices) is additionally added into the cavity and the total length of the single-mode optical fiber is 11.85 m in the cavity. The 80/20 optical coupler 1007 outputs the 20% laser light to the outside of the cavity, and returns 80% back. The intracavity loss makes the gain of the EDF in the vicinity of 1530 nm and 1560 nm be the same to meet the condition of generating dual wavelength mode locking.

Figures 11, 12:
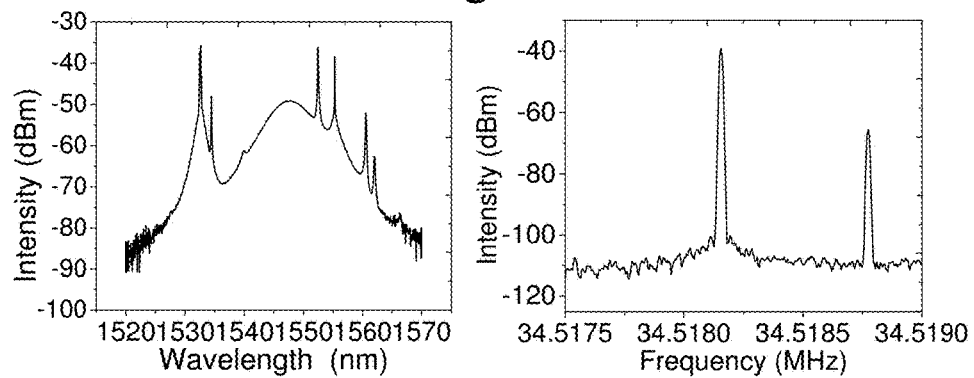
FIG. 11 is the output optical spectrum of the dual-wavelength pulse laser.
FIG. 12 is the radio-frequency (RF) spectrum of the output of the dual-wavelength pulse laser after photodetection.

When the pump power is about 80 mW, by introducing a vibration perturbation in the optical cavity, we can achieve the dual wavelength mode locking, and the center wavelength is 1532.46 nm and 1547.43 nm, as shown in FIG. 11. The spectrum of the output pulse is detected by a fast photoelectric detector and a spectrum analyzer, as shown in FIG. 12. Because of the chromatic dispersion in the optical cavity, the group velocity of the two wavelengths is different, so the repetition frequency of the two wavelength pulse is also different. As shown in the radio frequency spectrum diagram, the repetition frequency $f_1$ of the pulse with the center wavelength of 1532.46 nm is 34.518773 MHz. The repetition frequency $f_2$ of the pulse with the center wavelength of 1547.43 nm is 34.518156 MHz. The frequency difference $\Delta f$ is 617 Hz, and the pulses of the two wavelengths are oscillating at twice of the fundamental round-trip frequency of the cavity.

Figure 13:
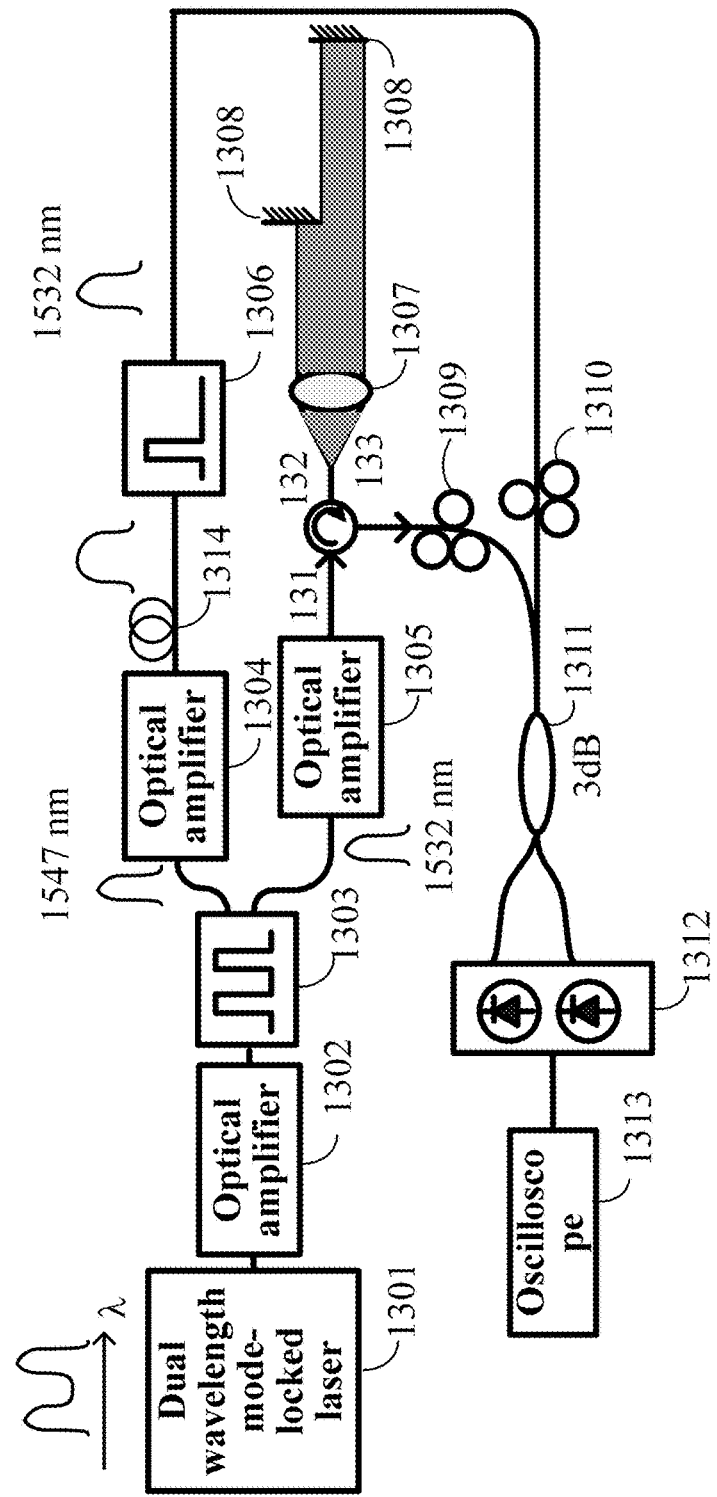
FIG. 13 is a schematic diagram showing an optical asynchronous sampling signal measurement apparatus for optical distance measurement.
Figure 14:
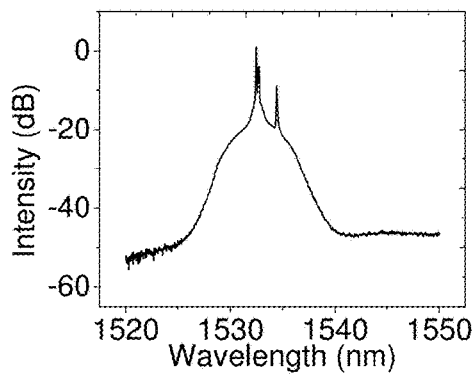
FIG. 14 is the spectrum of the optical pulse with the center wavelength of 1532 nm, obtained by filtering the output of the dual-wavelength pulse laser.
Figure 15:
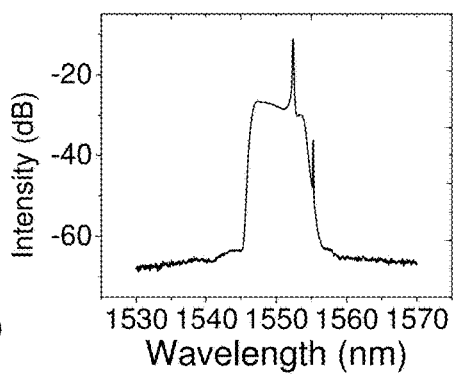
FIG. 15 is the spectrum of the optical pulse with the center wavelength of 1547 nm, obtained by filtering the output of the dual-wavelength pulse laser.

The optical path measurement apparatus of using the dual-wavelength mode-locked laser is shown in FIG. 13. The dual-wavelength mode-locked laser 1301 emits the light pulses, which are passed through the optical amplifier 1302 to realize the power amplification, and then the light pulses enter a four-channel band-pass optical filter 1303, where the filter channel with a passband of 1528.5 nm to 1536.5 nm can selectively pass the light pulse with the center wavelength of 1532.46 nm. The output spectrum is shown in FIG. 14. The filter channel with a passband of 1546 nm to 1554 nm lets the light pulse with the center wavelength 1547.43 nm to go through, and its output spectrum is shown in FIG. 15.

Figure 16:
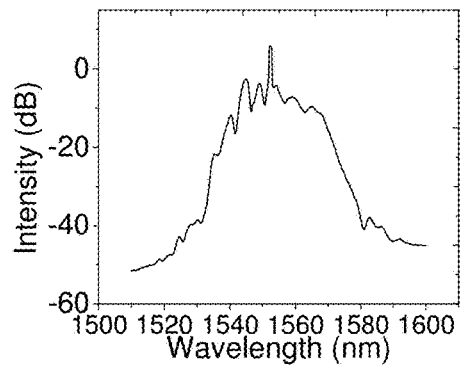
FIG. 16 is the spectrum of the optical pulse with the center wavelength of 1547 nm after been amplified by the optical amplifier 2 and its spectrum broadened.
Figure 17:
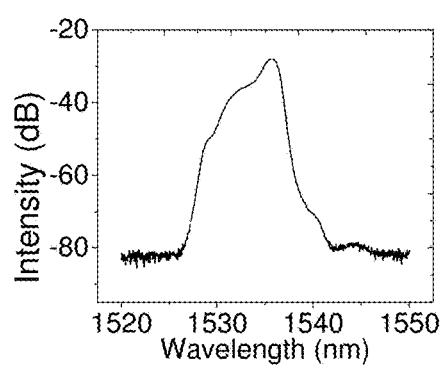
FIG. 17 is the spectrum of the output light passed through the band-pass filter with a passband of 1528 nm to 1536 nm after the spectrum broadening.

The light pulse with the center wavelength of 1547.43 nm is passed through the optical amplifier 1304 to realize the power amplification, and by using the nonlinear effect of the erbium doped fiber in the optical amplifier and the single-mode fiber 1314 to generate the spectral broadening, as shown in FIG. 16. As seen from FIG. 16, the spectrum has been significantly broadened, and there is considerable spectral components near 1532 nm, i.e. it now has significant spectral overlap with the light pulse with the center wavelength of 1532.46 nm, After passing through a bandpass filter 1306 with the passband of 1528 nm-1536 nm, as the reference optical pulse sequence for the light path measurement, its spectrum is shown in the spectrum in FIG. 17, where its power is about 60 W.

The light pulse with the center wavelength of 1532.46 nm is amplified by the optical amplifier 1305, and the power reaches about 15 mW, and then the pulse is input into the port of the circulator 131, and output from the port 132 as the first probe optical pulse sequence, which is launched through a cleaved tip of single-mode optical fiber and passed through the lens 1307 with a focal length of 12 mm to become a collimated beam. Part of the beam is reflected off mirror 1308, while another part of the beam is reflected off a distant mirror 1315, and coupled back into the optical fiber, and the light this time exits through port 133 of the circulator.

Figure 18:
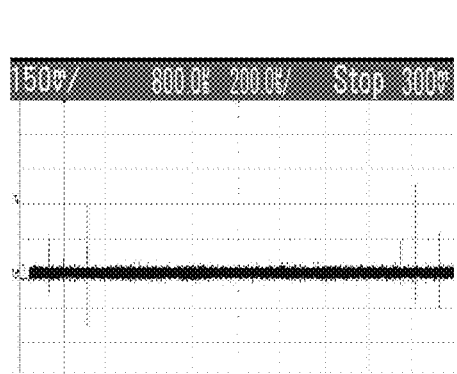
FIG. 18 is the field correlation signal measured by the oscilloscope.

The distance between the single mode optical fiber cleaved tip and the mirror 1308 is about 18.5 cm, while the distance between the two mirrors is about 29 cm. The optical path difference between the two mirrors will generate a relative delay τ between the pulses reflected from them respectively. The second probe pulse sequence output from the circulator port 133 and the reference optical pulse sequence are passed through the polarization controller 1309 and 1310, respectively, and are input into the 50/50 3 dB coupler 1311, which combines them, and then the light from the two output ports of the coupler is incident onto the two probes of the balance detector 1312. The output signal of the balance detector 1312 is detected by the oscilloscope 1313, and the time domain correlation signal can be obtained as shown in FIG. 18. It can be seen from FIG. 18, that there are 3 correlation peak signals, which are resultant from the light reflected back by the single mode fiber cleaved tip, mirror 1, and mirror 2 interfering with the reference optical pulse sequence, where the measured time differences Δτ between three peaks are 70 μs and 109 μs, respectively. Based on these numbers, and according to the equations of the time difference between the pulses τ=Δτ×Δf/$f_p$ and the optical path difference d=$v_g$*τ, the optical path between the single-mode fiber cleaved tip and the mirror 1 is determined as 37.5368 cm, and the optical path between the mirror 1 and the mirror 2 is 58.8262 cm.

In the above apparatus of determining the optical distance information through measuring the optical field correlation signal, nonlinear optical devices exists at least in either the signal light path or the reference light path, in order to broaden the spectrum of the light through that path. The effect of the optical amplifier is to amplify the optical signal, which enables that the amplified light can generate sufficiently strong nonlinear effects through passing the nonlinear optical devices, so that the spectrum after being broadened or shifted can overlap with the spectrum of the light in the other path. If the light before any amplification is strong enough to generate such an overlap, the use of the optical amplifier may not be necessary. The function of the polarization control device is to adjust the polarization state of the light signal, so that the two signals satisfy the polarization relationship required by the field correlation or intensity correlation measurement. If the two signals can generate the correlation signal before the adjustments, the use of the polarization controller is no longer necessary. The optical filter 1306 is to ensure that the spectra of the reference pulse sequence and the signal pulse sequence have similar center wavelengths, and is also not necessary.

Example 10

Figure 19:
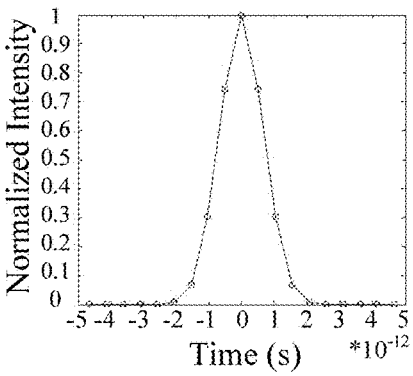
FIG. 19 is the schematic of the intensity correlation signal.

The principle of the dual-wavelength mode-locked laser used in this example is the same as the laser used in Example 9, where the optical pulses output by the dual-wavelength mode-locked laser pass through the optical splitting device, which divides the optical pulse with the center wavelength of 1532.46 nm and the optical pulse with the center wavelength of 1547.43 nm into two independent branches. One of the two optical pulses is used as a reference optical pulse sequence with its pulse width of 0.6 ps and another optical pulse is used as the first optical pulse sequence with its pulse width of 1 ps. The first optical pulse sequence merges to the signal optical pulse sequence after it goes through two different optical delays in the way of transmission. After adjusting the polarization state, the parallel beam of the signal optical pulse sequence and the reference optical pulse sequence are focused by a lens onto the second order nonlinear optical material, such as the frequency doubling crystal, BBO. The photomultiplier tube is placed after the BBO and collects the intensity correlation signal. The intensity correlation signal curve similar to that shown in FIG. 18 can be measured, where the intensity correlation signal of each peak is shown in FIG. 19. According to the measured time difference of the correlation signal in the sequence, the optical path information can be obtained by using the method similar to Example 9.

In the above apparatus, which get the optical path information by measuring the intensity related signal, the optical amplifier is used to amplify the optical signal, so that it can generate the intensity correlation signal through the nonlinear photoelectric detector. If the optical signal can generate the intensity correlation signal before amplification, then the optical amplifier is not necessary. The polarization controller device adjusts the polarization state of the optical signal to satisfy the demands of polarization relationship in intensity correlation. If the two optical signals can generate the correlation signal before the adjustment, the polarization controller is not necessary.

Example 11

Figure 20:
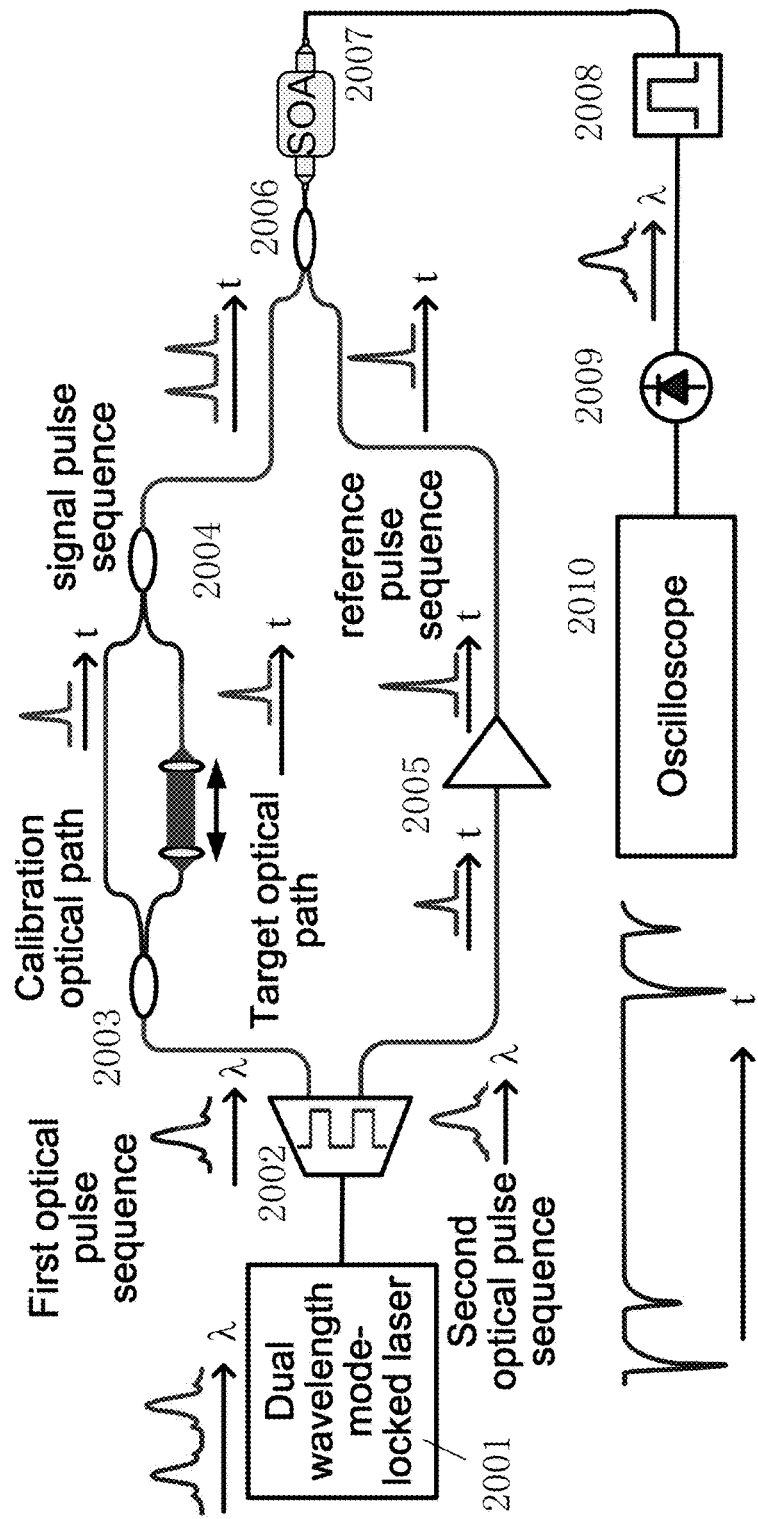
FIG. 20 is a schematic diagram of one optical asynchronous sampling signal measurement apparatus which can be used for light path measurement.
Figure 21:
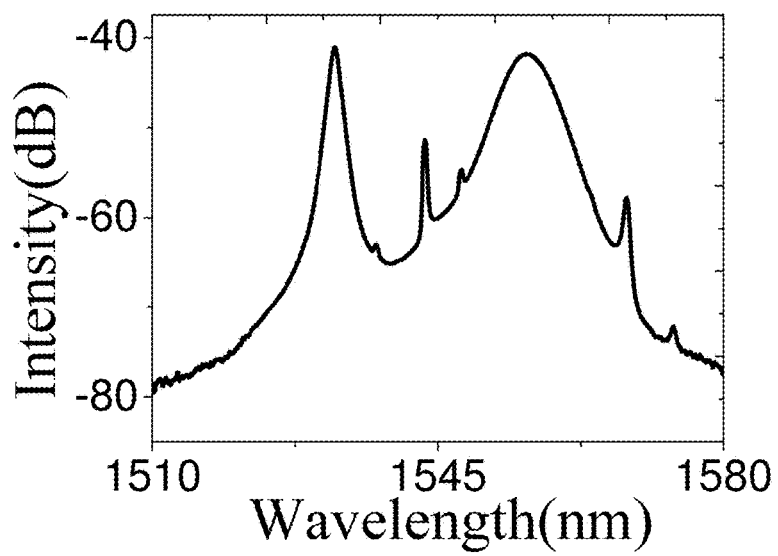
FIG. 21 is the output optical spectrum of a dual-wavelength pulse laser.
Figure 22:
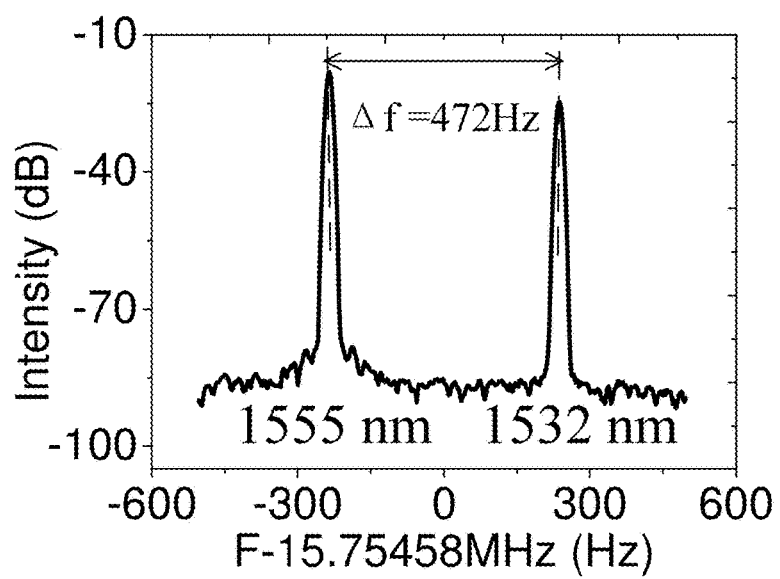
FIG. 22 is the radio-frequency spectrum of the output of a dual-wavelength pulse laser.

FIG. 20 is a schematic diagram of the optical asynchronous sampling measurement apparatus. The dual frequency pulse laser 2001 outputs two optical pulse sequences with different repetition frequencies. The frequency difference is 472 Hz, where the center wavelengths are 1532 nm and 1555 nm respectively. The output spectrum of the dual frequency pulse laser is shown in FIG. 21 and the radio frequency spectrum is shown in FIG. 22. The two optical pulse sequences are divided into two branches through the optical splitting device, which can be band-pass filter 2002. The optical pulse with its center wavelength of 1532 nm can be the first optical pulse sequence. The optical pulse with its center wavelength of 1555 nm can be the second optical pulse sequence.

Figure 23:
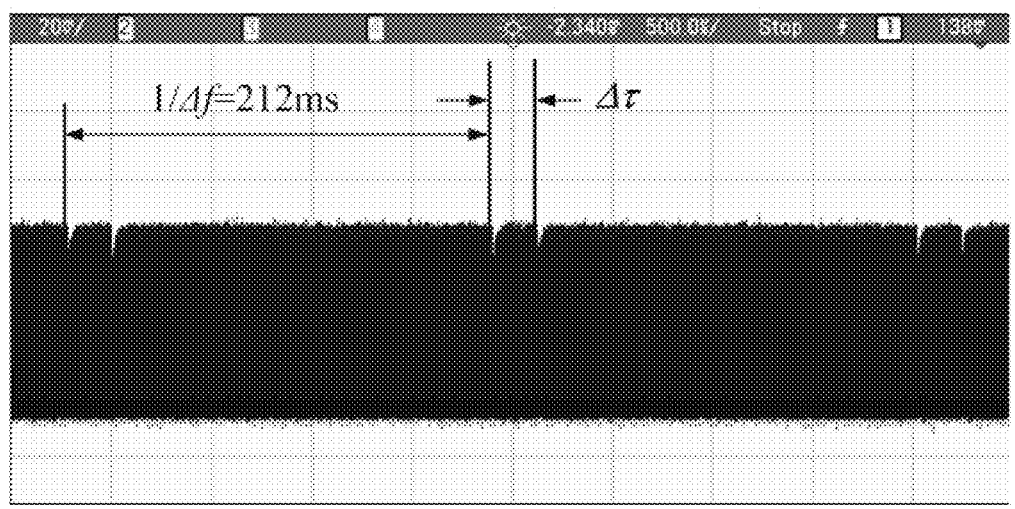
FIG. 23 is the time domain graph measured by an oscilloscope.

The first optical pulse sequence is divided into two branches after passing through the optical coupler 2003, where one branch becomes a calibration pulse sequence after the calibration delay and the other branch becomes a target pulse sequence after the target delay. The calibration pulse sequence and the target pulse sequence are passed through the optical coupler 2004 and merge into a signal pulse sequence. The second optical pulse sequence is amplified by the optical amplifier 2005 to generate a reference pulse sequence, which is passed through the optical coupler 2006 to generate one optical beam and input into a semiconductor optical amplifier (SOA) 2007 as the pulse interaction device. The output optical pulse sequence of the SOA is filtered through the filter 2008 and interacts with the reference pulse sequence, which is then converted to an electrical signal by the photoelectric detector 2009, and finally the oscilloscope 2010 measures the electrical signal, as the time domain graph shown in FIG. 23. Because the SOA has the characteristic of gain saturation, when the reference optical pulse and the signal optical pulse are coincident in the time domain, the reference optical pulse makes the SOA saturated and the transmittance of the signal optical pulse decreases. By measuring the time difference of the two falling edges Δτ, the distance difference between the target delay and the calibration delay can be calculated from d=$v_g$Δτ Δf/$f_1$, where $v_g$ is the group velocity of the signal pulse sequence.

Example 12

Figure 24:
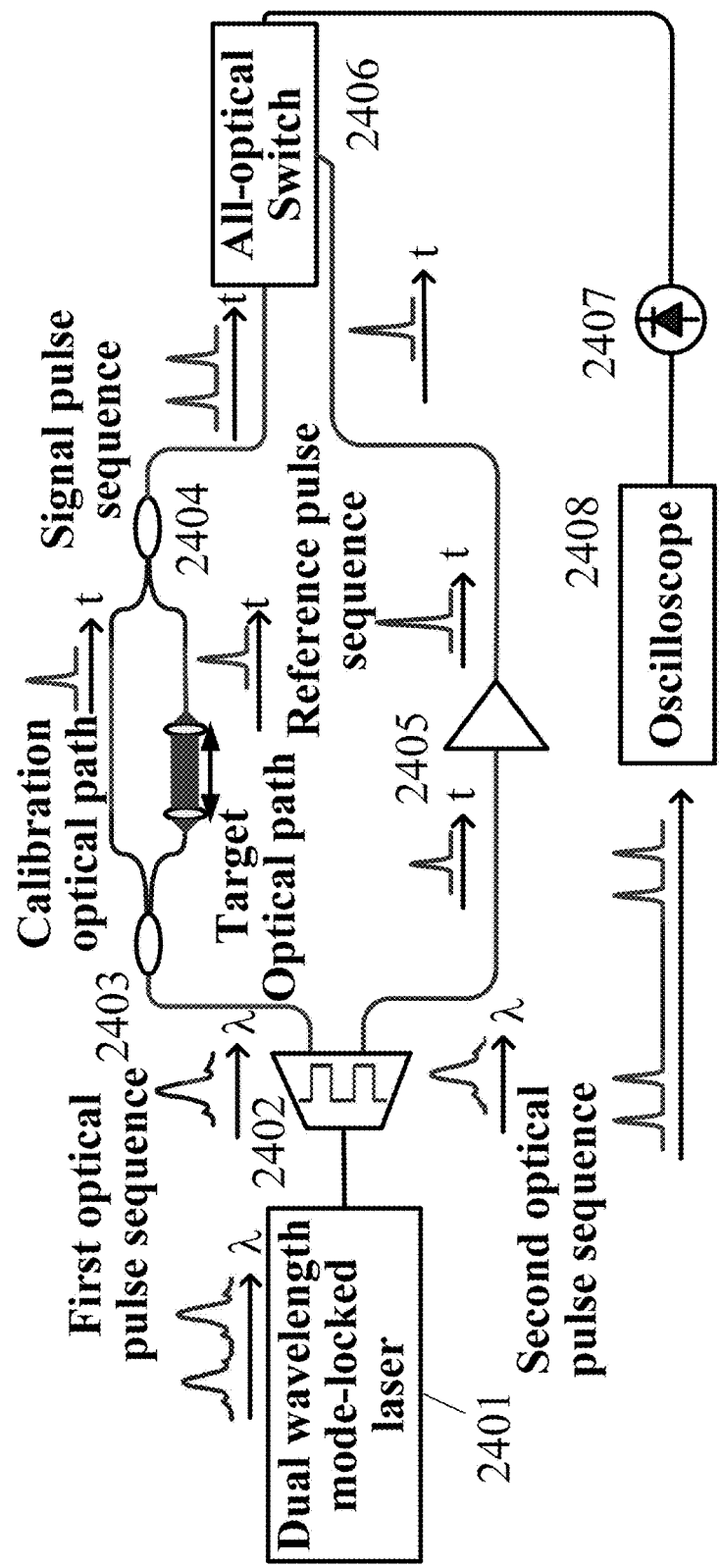
FIG. 24 is a schematic diagram of another optical asynchronous sampling signal measurement apparatus which can be used for optical distance measurement.

FIG. 24 is another schematic diagram of the optical asynchronous sampling measurement apparatus. The difference between this example and that shown in Example 11 is using the all-optical switch as a pulse interaction device. The dual frequency pulse laser 2401 outputs two optical pulse sequences with different repetition frequencies, where the frequency difference is 472 Hz, the center wavelengths are 1532 nm and 1555 nm, respectively. The optical pulse sequences are divided into two branches through the optical splitting device, which can be a band-pass filter 2402. The optical pulse sequence with its center wavelength of 1532 nm can be the first optical pulse sequence. The optical pulse sequence with its center wavelength of 1555 nm can be the second optical pulse sequence. The first optical pulse sequence is passed through the optical coupler 2403 and divided into two branches. One branch becomes the calibration pulse sequence after the calibration delay. The other branch becomes a target pulse sequence after the target delay. The calibration pulse sequence and the target pulse sequence are passed through the optical coupler 2404 and merge into the signal pulse sequence. The second optical pulse sequence is amplified by the optical amplifier 2405 to become the reference pulse sequence and controls the all-optical switch 2406 as the pulse interaction device pass light or not. When the pulse of the reference pulse sequence and the signal pulse sequence are coincident in time, the pulse of the signal pulse sequence can pass through the all-optical switching, otherwise it could not pass through the all-optical switching. The optical pulse sequence output by the all-optical switching is converted to an electrical signal by the photodetector 2407 and received by the oscilloscope 2408. By measuring the time difference of the two adjacent pulses $\Delta\tau$ in the electrical signal, the distance difference between the target delay and the calibration delay can be calculated from $d=v_g\Delta\tau\Delta f/f_1$, wherein $v_g$ is the group velocity of the signal pulse sequence.

Example 13

Figure 25:
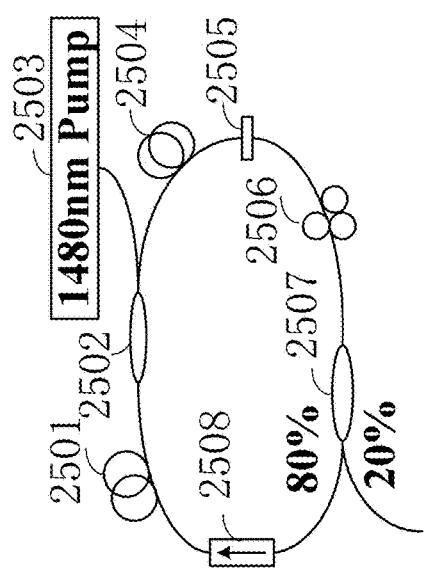
FIG. 25 is a schematic diagram of a dual-wavelength pulse laser apparatus.
Figure 26:
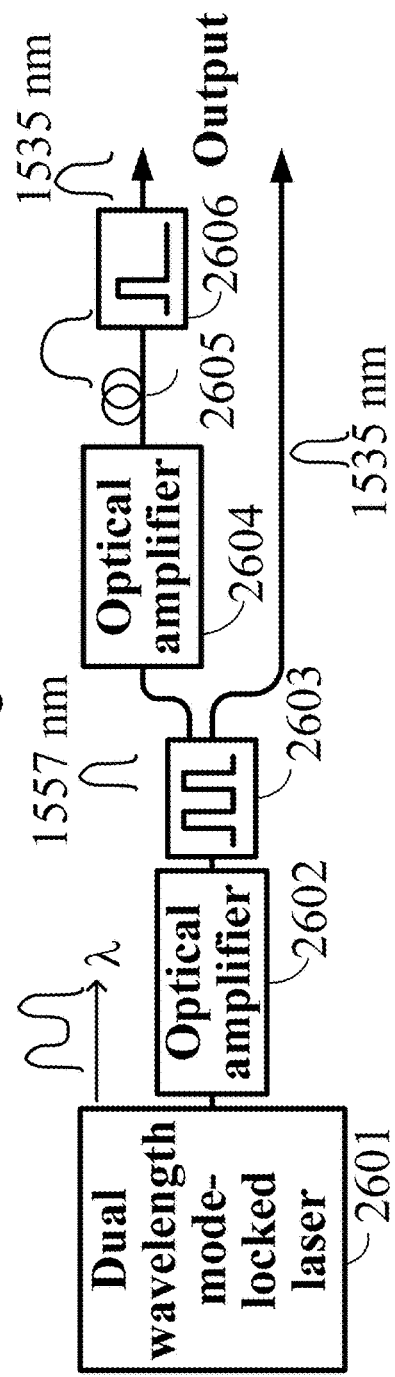
FIG. 26 is a schematic diagram of the apparatus using a dual-wavelength pulse laser to realize a multi-frequency optical comb.

The structure of the dual-wavelength mode-locked laser used is shown in FIG. 25. The laser is a passively mode-locked fiber laser with ring cavity structure. The pump light source is a semiconductor laser 2503 with its wavelength of 1480 nm, the pump light emitted is coupled into the erbium doped fiber (EDF) 2501 through the 1480/1550 wavelength division multiplexer 2502. The EDF is 5-meters-long and its absorption coefficient at 1530 nm is 6.1 dB/m. The EDF is connected to the optical isolator 2508 to ensure the light unidirectional transmission in the fiber cavity. The polarization controller 2506 in the cavity is to control the polarization state. The mode locker is the carbon nanotube/polyimide film 2503 and the thickness of the film is 45 microns, the loss of the mode locker is 3.5 dB when the film is sandwiched between two FC/PC connectors. The total length of the standard single-mode optical fiber 2504 is 6.1 m in the cavity. The 80/20 optical coupler 2507 outputs 20% of the light to the outside of the cavity, and returns 80% back.

Figure 27:
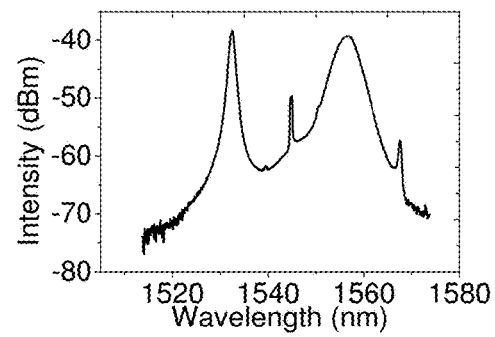
FIG. 27 is the output optical spectrum of a dual-wavelength mode-locked laser.
Figure 28:
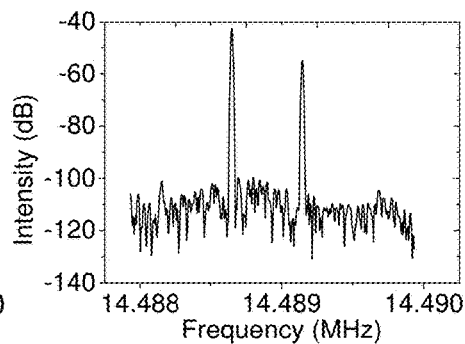
FIG. 28 is the radio-frequency spectrum of the signal after the photodetection of the output of the dual-wavelength mode-locked laser.

The intracavity loss makes the EDF have two gain peaks around 1530 nm and 1560 nm and meets the demands for generating dual-wavelength mode locking. The center wavelength of the dual wavelength mode locking is 1535 nm and 1557 nm, respectively. The output spectrum of the dual wavelength mode-locked laser is shown in FIG. 27. The radio-frequency spectrum of the output pulse is detected by a fast photoelectric detector and a spectrum analyzer, as shown in FIG. 28. Due to the dispersion of the optical fiber and other devices in the optical cavity, the group velocity of the two wavelengths is different, so that the repetition frequency of the optical pulse sequence with the two different wavelengths (i.e. frequency interval of the optical comb) is also different. As can be seen from the spectra, the repetition frequency $f_1$ of the pulse with the center wavelength of 1535 nm is 14.489145 MHz, and the repetition frequency of the pulse with the center wavelength of 1557 nm $f_2$ is 14.488649 MHz, where the frequency difference is 496 Hz.

Figure 29:
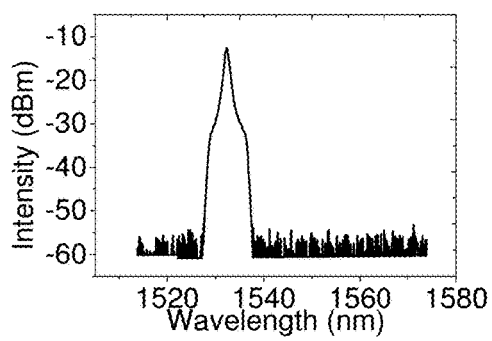
FIG. 29 is the spectrum of the optical pulse with the center wavelength of 1535 nm, obtained by filtering the output of the dual-wavelength mode-locked laser.
Figure 30:
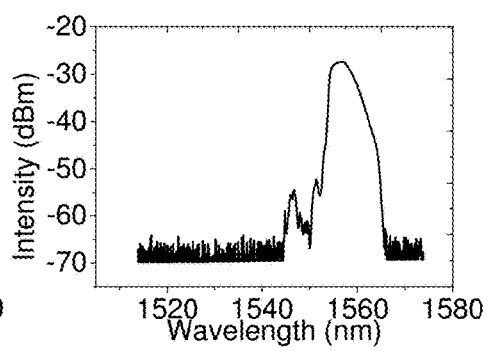
FIG. 30 is the spectrum of the optical pulse with the center wavelength of 1557 nm, obtained by filtering the output of the dual-wavelength pulse laser.
Figure 31:
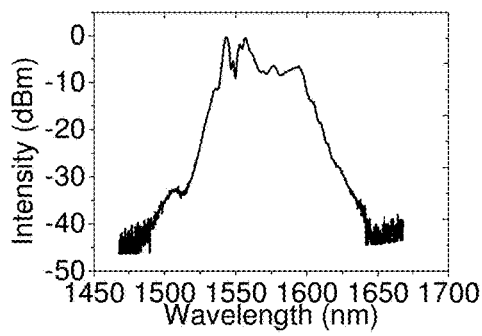
FIG. 31 is the spectrum of the optical pulse with the original center wavelength of 1557 nm, after been amplified by the optical amplifier and its spectrum broadened by transmitting through the single mode optical fiber.
Figure 32:
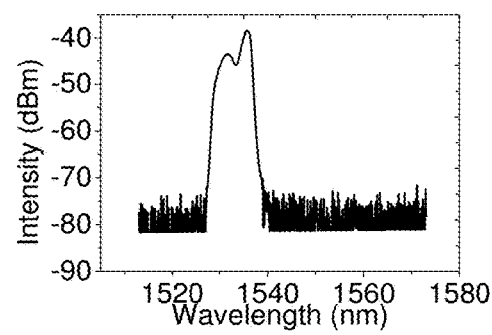
FIG. 32 is the spectrum of the output light through the band-pass filter with a passband of 1528 nm to 1536 nm after the spectrum of the pulse whose original center wavelength is 1557 nm is broadened.

The output light of the dual wavelength laser 2601 is amplified by the optical amplifier 2602, and then filtered by the optical filter 2603, to output two optical pulse sequences at two output ports. The optical spectrums are shown in FIG. 29 and FIG. 30. The spectrum of the optical pulse of 1557 nm is broadened by third order nonlinear effect (self phase modulation, the four wave mixing, etc.) of the optical fiber amplifier 2604 and the single-mode fiber 2605, as shown in FIG. 31. After being filtered by the filter 2606, the spectrum around 1535 nm is shown in FIG. 32. The apparatus outputs the optical comb with different frequency interval in the wavelength range of 1535 nm. The optical amplifier in the apparatus amplifies the optical signal, so that it can make the spectrum broaden and overlap with the spectrum of another signal by the nonlinear effects. However, the optical amplifier is not necessary, especially when the spectra of the optical signals are overlapped before being amplified.

Example 14

Figure 33:
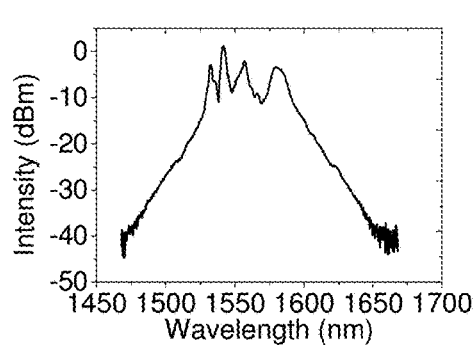
FIG. 33 is the spectrum of the output optical pulses of the dual-wavelength pulse laser, after the power amplification and the spectrum broadening realized by the optical amplifier and the single mode optical fiber.
Figure 34:
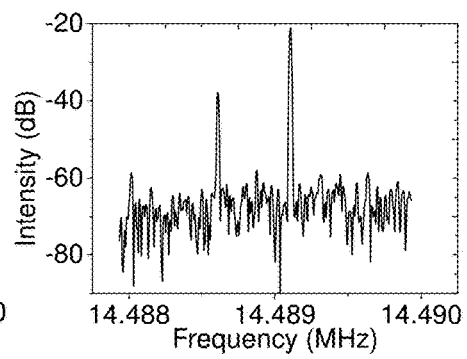
FIG. 34 is the radio-frequency spectrum of the signal of the dual-wavelength pulse laser output, after being passed through the optical amplifier and the single mode optical fiber to realize the multi-frequency optical comb, and then through the photodetector.

The dual wavelength mode-locked laser used in this example is the same as in Example 1. The output light is directly passed through the amplifier and the single-mode transmission optical fiber to broaden the spectrum of the light pulse sequence with different center wavelengths and make their spectra overlap by using third-order nonlinear effect of the gain fiber and the single mode optical fiber (self phase modulation, the four wave mixing, etc.), so that there are two optical combs with different frequency interval in the overlapping wavelength region, as shown in FIG. 33. The radio frequency spectrum of the signal after the photo-electric conversion is shown in FIG. 34. It shows the apparatus realizes the output of the optical comb with different frequencies. The optical amplifier in the apparatus is used to amplify the optical signal, so that it can make the spectrum broaden and overlap by the nonlinear effects. However, the optical amplifier is not necessary, especially when the spectrum of the optical signal can overlap before being amplified.

The above are only exemplary embodiments of the present application, and should not limit the breadth and the scope of protection. Many modifications and variations will be apparent to one of ordinary skill in the art. The embodiments were chosen and described in order to best explain the principles of the invention and its practical application, thereby enabling a person having ordinary skill in the art to understand technology scope disclosed by the application.

What is claimed is:

1. A method for measuring an optical asynchronous sampling signal comprising the steps of:
    a) generating a first optical pulse sequence with a first repetition frequency ($f_1$) from a pulsed light source;
    b) generating simultaneously with the first optical pulse sequence at least a second optical pulse sequence with a second repetition frequency ($f_2$) from the pulsed light source, where $f_1$ is different from $f_2$, and where a difference in repetition frequency ($\Delta f$) between $f_1$ and $f_2$ is equal to the absolute value of $f_1$ less $f_2$, and where the first optical pulse sequence the second optical pulse sequence are generated simultaneously by a method selected from the group consisting of modal dispersion, polarization mode dispersion, birefringence and chromatic dispersion in the resonant cavity of the pulsed light source;
    c) passing the first optical pulse sequence through a signal optical path to transform the first optical pulse sequence into a signal pulse sequence;
    d) passing the second optical pulse sequence through a reference optical path to transform the second optical pulse sequence into a reference pulse sequence; and
    e) passing the signal pulse sequence and the reference pulse sequence into a detection device to generate an asynchronous sampling signal determined by $f_1$ and $f_2$.

2. The method of claim 1, further comprising the step of performing a time-axis transformation on the asynchronous sampling signal to obtain a transformed asynchronous sampling signal using transform formula $\Delta T=\Delta\tau\Delta f/f_1$, wherein $\Delta\tau$ is temporal position of the asynchronous sampling signal, $\Delta T$ is actual temporal position determined after the time-axis transformation, and temporal information can be obtained based on the transformed asynchronous sampling signal, and spectral information can be further obtained by means of transforming between a time domain and a frequency domain.

3. The method of claim 1, further comprising inputting the first optical pulse sequence into a terahertz emission device, where a terahertz pulse sequence is generated, and the signal pulse sequence is formed.

4. The method of claim 3, further comprising passing the terahertz pulse sequence through a device under test to generate the signal pulse sequence.

5. The method of claim 3, further comprising inputting the first optical pulse sequence through one or more devices selected from the group consisting of power control devices, pulse waveform transformers, polarization controllers and nonlinear optical devices before entering a terahertz emission device.

6. The method of claim 3, where the second optical pulse sequence is transformed into the reference pulse sequence through one or more devices selected from the group consisting of power control devices, pulse waveform conversion devices, polarization controllers and nonlinear optical devices.

7. The method of claim 3, where the signal pulse sequence and the reference pulse sequence are input into a terahertz receiving device as the detection device to obtain the asynchronous sampling signal.

8. The method of claim 3, further comprising processing the asynchronous sampling signal to yield terahertz temporal waveform information and terahertz time-domain spectroscopy information.

9. The method of claim 1, further comprising inputting the signal pulse sequence and the reference pulse sequence into a device under test, and then measuring characteristics of the signal pulse sequence using an optical detector as the detection device to obtain the asynchronous sampling signal.

10. The method of claim 9, where the first optical pulse sequence is transformed into the signal pulse sequence after passing through one or more devices selected from the group consisting of power control devices, pulse waveform transformers, polarization controllers and nonlinear optical devices.

11. The method of claim 9, where the second optical pulse sequence is transformed into the reference pulse sequence through one or more devices selected from the group consisting of power control devices, pulse waveform transformers, polarization controllers and nonlinear optical devices.

12. The method of claim 9, where after processing of the asynchronous sampling signal, the pump-probe information of the device under test is obtained.

13. The method of claim 1, further comprising inputting the signal pulse sequence into a device under test, and the signal pulse sequence and the reference pulse sequence interact in the detection device to generate the asynchronous sampling signal.

14. The method of claim 13, where the first optical pulse sequence input into a device under test to generate signal pulse sequence after it passing through one or more devices selected from the group consisting of power control devices, pulse waveform transformer, polarization controllers and nonlinear optical devices.

15. The method of claim 13, where the second optical pulse sequence is transformed into the reference pulse sequence through one or more devices selected from the group consisting of power control devices, pulse waveform transformer, polarization controllers and nonlinear optical devices.

16. The method of claim 13, where the asynchronous sampling signal is processed to obtain time-domain spectroscopy information of the device under test.

17. A method for measuring an optical asynchronous sampling signal comprising the steps of:
  a) generating a first optical pulse sequence with a first repetition frequency ($f_1$) from a pulsed light source;
  b) generating simultaneously with the first optical pulse sequence at least a second optical pulse sequence with a second repetition frequency ($f_2$) from the pulsed light source, where $f_1$ is different from $f_2$, and where a difference in repetition frequency ($\Delta f$) between $f_1$ and $f_2$ is equal to the absolute value of $f_1$ less $f_2$, and where the first optical pulse sequence, the second optical pulse sequence and $\Delta f$ are generated by a method selected from the group consisting of modal dispersion, polarization mode dispersion, birefringence and chromatic dispersion in the resonant cavity of the pulsed light source;
  c) passing the first optical pulse sequence through a signal optical path to transform the first optical pulse sequence into a signal pulse sequence;
  d) passing the second optical pulse sequence through a reference optical path to transform the second optical pulse sequence into a reference pulse sequence; and
  e) passing the signal pulse sequence and the reference pulse sequence into a detection device to generate an asynchronous sampling signal determined by $f_1$ and $f_2$.

18. The method of claim 17, further comprising the step of performing a time-axis transformation on the asynchronous sampling signal to obtain a transformed asynchronous sampling signal using transform formula $\Delta T=\Delta\tau\Delta f/f1$, wherein $\Delta\tau$ is temporal position of the asynchronous sampling signal, $\Delta T$ is actual temporal position determined after the time-axis transformation, and temporal information can be obtained based on the transformed asynchronous sampling signal, and spectral information can be further obtained by means of transforming between time domain and frequency domain.

19. A method for measuring an optical asynchronous sampling signal comprising the steps of:
  a) generating a first optical pulse sequence with a first repetition frequency ($f_1$) from a pulsed light source;
  b) generating simultaneously with the first optical pulse sequence at least a second optical pulse sequence with a second repetition frequency ($f_2$) from the pulsed light source, where $f_1$ is different from $f_2$, and where a difference in repetition frequency ($\Delta f$) between $f_1$ and $f_2$ is equal to the absolute value of $f_1$ less $f_2$, where $\Delta f$ is not generated using an optical modulator, and where the first optical pulse sequence the second optical pulse sequence are generated simultaneously by a method selected from the group consisting of modal dispersion, polarization mode dispersion, birefringence and chromatic dispersion in the resonant cavity of the pulsed light source;
  c) passing the first optical pulse sequence through a signal optical path to transform the first optical pulse sequence into a signal pulse sequence;

d) passing the second optical pulse sequence through a reference optical path to transform the second optical pulse sequence into a reference pulse sequence; and
e) passing the signal pulse sequence and the reference pulse sequence into a detection device to generate an asynchronous sampling signal determined by $f_1$ and $f_2$.

\* \* \* \* \*

UNITED STATES PATENT AND TRADEMARK OFFICE
CERTIFICATE OF CORRECTION

PATENT NO. : 9,863,815 B2  
APPLICATION NO. : 14/968289  
DATED : January 9, 2018  
INVENTOR(S) : Zheng et al.

Page 1 of 1

It is certified that error appears in the above-identified patent and that said Letters Patent is hereby corrected as shown below:

On the Title Page

Item (54) and in the Specification Column 1, Line 1, should read as follows:
METHOD AND APPARATUS FOR OPTICAL AND TERAHERTZ ASYNCHRONOUS SAMPLING SIGNAL MEASUREMENT Signed and Sealed this  
Nineteenth Day of June, 2018

Andrei Iancu  
*Director of the United States Patent and Trademark Office*